United States Patent
Fischmann

(10) Patent No.: US 12,516,534 B1
(45) Date of Patent: *Jan. 6, 2026

(54) SUSTAINABLE HEAT TRANSFER SYSTEM THAT INCLUDES A DIGITAL PROCESSING FACILITY AND A RECREATIONAL MAN-MADE SWIMMING LAGOON THAT PROVIDES COOLING TO SUCH FACILITY, THE SYSTEM BEING CONFIGURED FOR CONTRIBUTING TO ENVIRONMENTAL SUSTAINABILITY AND COMMUNITY BENEFITS

(71) Applicant: Crystal Lagoons Technologies, Inc., Miami, FL (US)

(72) Inventor: Fernando Fischmann, Miami, FL (US)

(73) Assignee: CRYSTAL LAGOONS TECHNOLOGIES, INC., Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/095,944

(22) Filed: Mar. 31, 2025

Related U.S. Application Data

(63) Continuation of application No. 19/051,926, filed on Feb. 12, 2025.

(60) Provisional application No. 63/720,570, filed on Nov. 14, 2024.

(51) Int. Cl.
*E04H 4/12* (2006.01)
*E04H 4/00* (2006.01)

(52) U.S. Cl.
CPC .......... *E04H 4/129* (2013.01); *E04H 4/0006* (2013.01); *E04H 4/1209* (2013.01)

(58) Field of Classification Search
None
See application file for complete search history.

(56) References Cited

U.S. PATENT DOCUMENTS

| | | | |
|---|---|---|---|
| 6,419,840 B1 * | 7/2002 | Meincke | E04H 4/169 4/492 |
| 7,036,449 B2 * | 5/2006 | Sutter | B63B 35/44 114/264 |
| 7,820,055 B2 | 10/2010 | Fischmann Torres | |
| 8,062,514 B2 | 11/2011 | Fischmann Torres | |
| 8,070,942 B2 | 12/2011 | Fischmann Torres | |
| 8,454,838 B2 * | 6/2013 | Fischmann | C02F 9/00 210/764 |
| 8,465,651 B2 * | 6/2013 | Fischmann | E04H 4/1281 210/753 |

(Continued)

FOREIGN PATENT DOCUMENTS

| | | | | |
|---|---|---|---|---|
| KR | 20220023969 A | * | 3/2022 | |
| TN | 2013000376 A1 | * | 1/2015 | C02F 1/52 |
| WO | WO-2020263488 A1 | * | 12/2020 | C02F 1/004 |

*Primary Examiner* — Jenna M Maroney
(74) *Attorney, Agent, or Firm* — MERCHANT & GOULD P.C

(57) ABSTRACT

A sustainable heat transfer system that includes a digital processing facility and a recreational man-made swimming lagoon that provides cooling for such facility, the system being configured for contributing to environmental sustainability and community benefits, comprising a man-made swimming lagoon, a High Temperature Water Treatment System, and a waste heat transfer mechanism.

30 Claims, 4 Drawing Sheets

(56) References Cited

U.S. PATENT DOCUMENTS

| | | | |
|---|---|---|---|
| 8,518,269 B2* | 8/2013 | Fischmann | C02F 1/004 |
| | | | 210/721 |
| 8,753,520 B1* | 6/2014 | Fischmann | C02F 1/008 |
| | | | 210/764 |
| 8,790,518 B2 | 7/2014 | Fischmann Torres | |
| 9,051,193 B2 | 6/2015 | Fischmann T. | |
| 9,062,471 B2 | 6/2015 | Fischmann T. | |
| 9,080,342 B2 | 7/2015 | Fischmann T. | |
| 9,470,007 B2 | 10/2016 | Fischmann Torres | |
| 9,470,008 B2* | 10/2016 | Fischmann | C02F 1/5281 |
| 9,708,822 B2 | 7/2017 | Fischmann Torres | |
| 9,920,498 B2* | 3/2018 | Fischmann | E02B 15/041 |
| 9,957,693 B2 | 5/2018 | Fischmann Torres et al. | |
| 10,486,074 B2* | 11/2019 | Fischmann | E04H 4/1281 |
| 10,521,870 B2* | 12/2019 | Fischmann | E04H 4/12 |
| 10,724,260 B2 | 7/2020 | Fischmann | |
| 10,982,400 B2* | 4/2021 | Rodriguez Larreta | |
| | | | A01K 61/20 |
| 10,994,215 B2 | 5/2021 | Fischmann | |
| 10,997,683 B2 | 5/2021 | Fischmann | |
| 10,997,684 B2 | 5/2021 | Fischmann | |
| 11,015,333 B2* | 5/2021 | Fischmann | E04H 3/22 |
| 11,098,495 B2* | 8/2021 | Fischmann | G06Q 10/04 |
| 11,123,645 B2* | 9/2021 | Fischmann | E02F 3/8858 |
| 11,132,663 B2* | 9/2021 | Fischmann | E04H 4/0006 |
| 11,167,218 B2 | 11/2021 | Fischmann | |
| 11,186,981 B2* | 11/2021 | Fischmann | E04B 1/342 |
| 11,250,533 B2 | 2/2022 | Fischmann | |
| 11,270,400 B2* | 3/2022 | Fischmann | E04B 1/342 |
| 11,280,099 B2* | 3/2022 | Fischmann | E04H 4/148 |
| 11,453,603 B2* | 9/2022 | Fischmann | C02F 1/004 |
| 11,669,929 B2 | 6/2023 | Fischmann | |
| 11,732,493 B2 | 8/2023 | Fischmann | |
| 12,110,236 B2 | 10/2024 | Fischmann | |
| 12,158,019 B2* | 12/2024 | Kovarik | C02F 1/001 |
| 12,163,354 B2* | 12/2024 | Fischmann | E04H 4/148 |
| 2019/0232180 A1* | 8/2019 | Fischmann | G07C 9/10 |
| 2019/0236744 A1* | 8/2019 | Fischmann | C02F 1/004 |
| 2020/0023281 A1* | 1/2020 | Fischmann | E02F 3/8858 |
| 2020/0032502 A1* | 1/2020 | Fischmann | E04H 3/14 |
| 2020/0032503 A1* | 1/2020 | Fischmann | E04H 17/00 |
| 2020/0051057 A1* | 2/2020 | Fischmann | G07F 17/0042 |
| 2020/0074577 A1* | 3/2020 | Fischmann | A63G 31/007 |
| 2020/0074579 A1* | 3/2020 | Fischmann | E04B 1/342 |
| 2020/0208423 A1 | 7/2020 | Fischmann | |
| 2020/0208425 A1* | 7/2020 | Fischmann | E04H 4/144 |
| 2022/0170281 A1 | 6/2022 | Fischmann | |
| 2022/0178159 A1* | 6/2022 | Casadio | E04H 4/0081 |
| 2022/0188960 A1 | 6/2022 | Fischmann | |
| 2022/0205681 A1* | 6/2022 | Fischmann | E02B 3/00 |
| 2023/0047399 A1* | 2/2023 | Fischmann | E04H 4/148 |
| 2023/0057876 A1* | 2/2023 | Fischmann | E04H 4/1218 |
| 2023/0058612 A1* | 2/2023 | Fischmann | E04H 4/0006 |
| 2023/0249986 A1* | 8/2023 | Fischmann | C02F 1/004 |
| | | | 205/776 |

* cited by examiner

SUSTAINABLE HEAT TRANSFER SYSTEM THAT INCLUDES A DIGITAL PROCESSING FACILITY AND A RECREATIONAL MAN-MADE SWIMMING LAGOON THAT PROVIDES COOLING TO SUCH FACILITY, THE SYSTEM BEING CONFIGURED FOR CONTRIBUTING TO ENVIRONMENTAL SUSTAINABILITY AND COMMUNITY BENEFITS

PRIORITY

This application is a continuation of U.S. application Ser. No. 19/051,926 filed on Feb. 12, 2025, which claims the benefit of U.S. Provisional Application No. 63/720,570 filed on Nov. 14, 2024, the entire contents of both applications are incorporated herein by reference.

FIELD OF THE INVENTION

The present invention relates to sustainable cooling systems for digital processing facilities, including but not limited to data centers, cryptocurrency mining operations, and other high-performance computing environments, which utilize waste heat for heating recreational man-made swimming lagoons and at the same time can provide cooling for such facilities. More specifically, the invention addresses, individually or altogether, the sustainable cooling of the digital processing facilities, and the integration of the waste heat management with large-scale man-made swimming lagoons for recreational use and the practice of water sports, offering an environmentally responsible solution to the high energy demands of traditional cooling systems while providing community and recreational benefits with a heated man-made swimming lagoon for bathing and water sports use.

The invention addresses the enormous and pressing problem of the excessive water and energy consumption of digital processing facilities, providing a sustainable cooling system, and also transforming otherwise lost waste heat into a unique opportunity by generating breathtaking lagoons with crystal-clear, heated water, by reusing wasted energy.

This revolutionary approach not only reduces energy and water consumption in terms of cooling requirements, but also creates stunning recreational spaces that redefine urban living bringing the idyllic tropical beach life to urban areas, providing unparalleled beauty and community benefits while eradicating traditional energy wastage. The system incorporates advanced heat transfer mechanisms and components configured with complex water treatment protocols, allowing for efficient heat dissipation and optimal swimming lagoon conditions, contributing to both energy savings and the reduction of environmental impact. This invention is particularly suited for data centers, crypto mining, and other industrial facilities that generate significant waste heat and seek to improve sustainability through innovative resource utilization.

BACKGROUND

In recent years, the number of datacenter facilities worldwide has grown significantly, driven by increasing global demand for data processing, storage, and cloud-based services. According to industry reports, worldwide, the total number of datacenters in 2024 is approximately 10,000, and about 2,000 more are expected to be installed in 2025. This growth is further fueled by the expanding use of artificial intelligence, the Internet of Things (IoT), and the widespread adoption of edge computing.

The global datacenter market is expected to continue its upward trajectory, supported by a surge in digital transformation initiatives across industries, a growing reliance on online services, and the ongoing development of 5G infrastructure. Analysts project that the overall capacity of datacenters will increase by over 20% annually, with significant investments in hyper scale facilities to meet the needs of cloud providers and large-scale enterprises. By 2030, datacenter energy consumption is projected to increase between 60% and 100%, an astonishing rise in the amount of energy required, yet how this unprecedented surge will be managed remains alarmingly unclear. Moreover, in 2022 datacenters accounted for 3% of the total electricity consumed in the U.S., whereas by 2030 it is projected that they will account for 8% of the total energy consumed in the U.S. This looming energy crisis underscores the urgent need for revolutionary energy efficiency solutions, without which the entire industry risks facing crippling operational costs and a disastrous environmental footprint.

Simultaneously, the number of cryptocurrency mining operations worldwide has expanded significantly, driven by increasing global interest in digital currencies like Bitcoin and Ethereum. As of 2024, there are thousands of crypto-mining plants globally, with the largest concentrations in regions like North America, Central Asia, and Northern Europe. Industry reports estimate that the global crypto mining market will grow at a compound annual growth rate (CAGR) of 12.2% through 2032, supported by advances in mining hardware and the rising value of cryptocurrencies.

The global crypto mining market is expected to maintain its growth trajectory, propelled by the ongoing development of block chain technology, the increased institutional adoption of digital assets, and the continued expansion of decentralized finance (DeFi). Analysts project that the overall computing power, or hashrate, required by mining operations will increase significantly.

The expansion of these digital infrastructure facilities, however, brings challenges related to efficient resource management, environmental sustainability, and scalability, necessitating innovations in cooling, energy optimization, and data handling technologies. As the number of facilities grows, so does the need for methods and systems to ensure operational reliability, minimize downtime, and optimize resource allocation.

The environmental impact of this situation is particularly significant, as traditional cooling systems are highly resource-intensive, consuming vast amounts of water and/or energy. This not only affects local water resources but also contributes to higher greenhouse gas emissions due to energy consumption. Socially, the reliance on water-intensive cooling systems can lead to conflicts over water usage, particularly in areas facing water scarcity. Water consumption, particularly for cooling systems, has become a critical concern, prompting the need for sustainable water management solutions to minimize the environmental impact of digital processing facility. Cooling systems, especially in larger facilities, rely heavily on water for heat dissipation, which lead to significant resource consumption.

Nowadays, digital infrastructure facilities often use cooling towers as their cooling systems. While broadly used in the industry, recently the cooling towers have shown to produce important safety hazards and challenges. A cooling tower is a heat rejection system that extracts waste heat, for example from a datacenter, and releases it into the atmosphere, primarily through the process of evaporative cooling. The cooling water is typically maintained at a temperature of around 26° C. to 32° C. (79° F. to 90° F.) to efficiently reject heat (depending on the operational conditions of the cooling process). These towers are highly water-intensive and can pose environmental and health risks. One significant concern in the operation of cooling towers is the potential for the proliferation of *Legionella* bacteria, which can lead to Legionnaires' disease if not properly managed. *Legionella* can thrive in the warm water environments of cooling towers, being a latent biohazard that has already produced many contagion events in populations that live nearby.

Additionally, cooling towers require permanent chemical treatment, as evaporation concentrates dissolved minerals, thereby intensifying conditions favorable to scale formation. This permanent chemical treatment poses yet another environmental hazard. A phenomenon known as "drifting" occurs when these chemical-laden water droplets escape the cooling tower and are dispersed into the surrounding environment. This mist can carry harmful chemicals and even bacteria like *Legionella*, increasing the risk of exposure to nearby communities and ecosystems. In light of these growing concerns, many countries have begun tightening regulations on cooling towers, and in some cases, they have been outright banned due to the threats of *Legionella* outbreaks, chemical exposure, and excessive water consumption. As a result, industries are increasingly transitioning to alternative cooling systems, particularly the systems called "chillers".

Chillers are used to provide cooled water or air that helps maintaining the temperature within a digital infrastructure facility, usually aiming to keep the equipment temperature to prevent overheating. However, chillers are known for their high energy consumption, which makes them a significant contributor to operational costs. For example, it has been estimated that chillers account for between 40% and 50% of the energy consumed by datacenters, which increases their operational costs and affects their efficiency. Moreover, chillers can represent a substantial investment for digital infrastructure facilities operators, with costs ranging anywhere from $50 to $100 million US dollars for large-scale, high-capacity systems of 50 MW, depending on specific features and requirements. In addition to the initial investment, the ongoing maintenance of chillers adds significant costs, including energy expenses, routine servicing, and replacement of components. Annual maintenance costs for chillers of large-scale, high-capacity systems can exceed millions of dollars, especially when factoring in the energy consumption of these systems that alone accounts for more than $10 million yearly, besides other costs such as specialized technicians and refrigerant management. Chillers are a highly energy-intensive component, and for example, to provide a clearer perspective, in a 100 MW data center, approximately 40-50 MW of the total power consumption can be attributed to the operation of chillers. This high energy consumption not only increases operational costs but also contributes to a larger carbon footprint, especially in regions where energy is primarily generated from non-renewable sources. Reducing energy usage in these systems is therefore critical to improving the sustainability and cost-efficiency of digital infrastructure. Also, for example, the cost to build a 50 MW datacenter can be approximately US$525 million, of which US$200 million can be attributed to its chillers.

The use of refrigerants in chillers also raises environmental concerns, as many of these substances have high global warming potential (GWP). Maintenance of chiller systems can be complex and costly, requiring specialized technicians and routine inspections to ensure efficiency and prevent failures.

As digital infrastructure facilities expand and strive for sustainability, the industry is increasingly looking toward alternative cooling solutions that can reduce dependence on traditional chiller systems.

In this context, as digital infrastructure facilities continue to grow in both number and energy consumption, the challenges associated with traditional cooling systems such as cooling towers and chillers highlight the urgent need for new, innovative solutions. To ensure sustainability, efficiency, and reliability, alternative or complementary cooling technologies that address water consumption, energy efficiency, and environmental concerns are crucial. Embracing these new solutions is essential to meet the increasing demand for digital infrastructure facilities while minimizing the environmental impact of digital processing facility operations.

Further, it is important to mention that it has been estimated that the residual heat generated by data centers worldwide amounts to approximately 60-125 TWh annually. To put this into perspective, this is roughly equivalent to the total annual energy consumption of a country such as Sweden. Moreover, this amount of heat is equivalent to the energy needs of 6 to 12 million homes in the USA. Similarly, the energy consumption of the global cryptocurrency and block chain networks has been estimated to be around 110-130 TWh annually, which assuming a typical efficiency of around 50%, would render approximately 55-65 TWh of waste heat. The heat generated by datacenters is in the order of $1,656 \times 10^8$ Joules, which could satisfy a substantial portion of the industrial and municipal heat demand of the world.

Despite the scale of this thermal energy (as waste heat), there is currently no widespread or efficient way to utilize it, largely due to it being low temperature waste heat. For example, for direct use in district heating processes, it would be necessary to increase the temperature of the residual heat before it can be effectively used, adding complexity and cost to the process. This presents a unique opportunity for innovative systems to harness this untapped energy, reducing overall energy waste and contributing to sustainability efforts.

In another context, tropical and paradisiacal beaches are recognized as some of the most sought-after destinations globally. The universal desire to relax and engage in outdoor recreational activities is particularly pronounced during warmer seasons. Tropical environments and beach settings rank among the top preferences for international tourists, while domestic travelers also exhibit a strong preference for beach destinations, driven by a need to escape daily routines and experience rejuvenation in a tropical setting. In the United States, for instance, coastal regions, though comprising less than 10% of the total land area (excluding Alaska), house approximately 39% of the population, as reported by the National Ocean Service. However, many coastal beaches present conditions that are unsuitable for recreational swimming or water sports. These conditions include cold water, strong winds, dark sand, and various safety risks such as dangerous currents, surf, marine life, and rocky shorelines. Consequently, a significant portion of the population does not partake in water-related activities in such areas.

In contrast, the idealized vision for many people consists of beaches with warm water, white sand and clear, turquoise waters, typical of tropical environments. These settings offer an immersive experience in a beach-like environment, enhancing the overall perception of an idyllic lifestyle. In addition to swimming, such environments are conducive to beach life and the practice of water sports, which cannot be effectively accommodated by conventional residential or community pools.

For simulating this tropical environment in urban or non-coastal areas, advanced water treatment and design technologies have been employed to create large-scale man-made swimming lagoons with pristine-clear waters and natural aesthetics. These lagoons are designed to replicate the visual and sensory experience of tropical beaches, incorporating features like a dimension suitable for water sports, white sandy shores, and turquoise water coloration.

Nonetheless, in colder parts of the world or during colder seasons of the year, maintaining the appeal and functionality of these artificial lagoons presents additional challenges. To ensure year-round usability, the necessity of heating such man-made swimming lagoons has appeared, which renders a new set of challenges for ensuring safety, recreational, and visual aspects at higher temperatures.

Additionally, thermal waters have become another highly desirable feature in recreational settings, offering relaxation and wellbeing. Natural hot springs, which are often found in tropical and volcanic regions, are known for promoting wellness and relaxation. These waters provide a soothing alternative to traditional recreational activities and are especially popular in colder climates where beach-like conditions are unavailable. However, access to natural thermal waters is geographically limited, and the infrastructure required to develop such facilities can be both costly and complex.

Conventional swimming pools, by their design, do not offer the features required to replicate the ambiance and aesthetic of a tropical beach setting, or the features required for the practice of water sports. For the purposes of the present invention, a conventional swimming pool is defined in accordance with global standards, as an impermeable water body constructed with a full concrete shell that is then painted, or similar. Such conventional pools as per regulatory guidelines (e.g., 2024 United States Florida Department of Health Rule 64E-9), require filtration of the entire water volume four times per day, must maintain a minimum residual chlorine level of 1.0 mg/L across the water volume, and require that pools larger than 30 feet in width (about nine meters), and that have a combination of wall and floor inlets, should have: A number of wall inlets such that the maximum spacing between the wall inlets is 20 feet (about six meters) and floor inlets are provided for the pool water area beyond a 15 feet (about 4.5 meters) perpendicular distance from all walls; and a number of floor inlets such that the spacing between adjacent inlets does not exceed 20 feet (about six meters) and the distance from a floor inlet and an adjacent wall does not exceed 25 feet (about 7.6 meters). Although public swimming pools provide a space for swimming, they fail to meet key parameters necessary for practicing water sports or to replicate the experience of a beach lifestyle or an urban beach entertainment complex in a tropical setting.

Also, it is important to mention that while there are few references of conventional small-sized swimming pools that are heated by digital facilities' waste heat, these are very small pools that from an aesthetic and functional perspective do not provide the look and feel of a tropical lagoon ambiance and do not allow the practice of water sports. Further, given their small surfaces and volumes, small pools cannot achieve the temperature gradients necessary to provide proper cooling to a medium-scale digital facility (of at least 0,3 MW of IT equipment power). Also, conventional swimming pool high construction and operations costs do not allow to economically escalate such structures into large water bodies that can provide cooling for medium to large scale digital processing facilities.

Further, the few operational small sized commercial swimming pools that are heated by waste heat of digital facilities, are within enclosed spaces (indoor), and therefore cannot achieve the required evaporation and heat dissipation rates to provide cooling to the digital facility.

In conclusion, the increasing demand for water and energy in digital infrastructure facilities, and the huge amount of lost residual energy with no use, combined with the growing popularity of man-made recreational lagoons, presents a unique opportunity for the development of innovative technologies that address both sectors. The challenges faced by traditional cooling systems in digital infrastructure facilities, including high energy consumption, water usage, and environmental concerns, parallel the operational needs of large-scale man-made swimming lagoons that require energy-efficient heating systems for reaching warm water temperatures. These elevated temperatures, in turn, require a man-made swimming lagoon adapted to maintain safety and recreational quality standards under such conditions, further incorporating mechanisms to address issues like sanitary and physicochemical quality, corrosion and scaling associated with high water temperatures. By integrating advanced cooling technologies that integrate synergistically solutions to these two challenges, there is potential to create a more sustainable technology. There is a need for hybrid technologies that could drastically reduce water and energy consumption, promote environmental responsibility, and offer year-round recreational opportunities, while simultaneously supporting the growing digital infrastructure facility demands.

SUMMARY

The present technology comprises a sustainable heat transfer system comprising a digital processing facility (1) and a recreational man-made swimming lagoon (2), the system being configured for contributing to environmental sustainability and community benefits, comprising:

a. the man-made swimming lagoon (2) with a water surface of between 3,000 $m^2$ to 1,000,000 $m^2$ that is configured and arranged to receive waste heat from the digital processing facility (1), so that at least a portion of the man-made swimming lagoon (2) is heated and maintained between 25° C. and 40° C., wherein the man-made swimming lagoon (2) comprises a bottom covered with a non-permeable material, b. a High Temperature Water Treatment System (HTWTS)(3) comprising, an oxidant injection unit (4) configured with an oxidant injection protocol, consisting on performing an oxidant treatment cycle, wherein:

i. the oxidant treatment cycle consists of maintaining a minimum ORP in the man-made swimming lagoon (2) at a specific value for a particular temperature of the water, starting at 500 mV at 25° C. and increasing linearly to 750 mV at 40° C., ii. the protocol includes a minimum time for each oxidant treatment cycle at 40° C. of 30 minutes and a minimum time for each oxidant treatment cycle at temperatures below 40° C. of 3 additional hours per each °C. below 40°C., according to the following equations:

$$\text{Minimum } ORP\ (T) = 500\ \text{mV} + 16.67\ \text{mV}/°\text{C.} * (T - 25°\text{C.})$$

$$t(T) = \begin{cases} 30\text{min} & \text{if } T = 40°\text{C.} \\ 30\ \text{min} + 180\ \text{min}/°\text{C.} * (40°\text{C.} - T) & \text{if } 25°\text{C.} \le T < 40°\text{C.} \end{cases}$$

wherein,
T is the average temperature of the water in the at least a portion of the man-made swimming lagoon (2) in °C.,
t is time in minutes;
c. a waste heat transfer mechanism (5) to exchange the heat from digital processing facility (1) with the water of the man-made swimming lagoon (2), wherein the sustainable heat transfer system is configured to transfer heat from the digital processing facility (1) to the man-made swimming lagoon (2) through conduction, convection, radiation, or combinations thereof,
d. wherein the water contained within the man-made swimming lagoon (2), when using fresh water, has a Thermo-Hardness Index (THI) value from 0 to 1 wherein the THI is defined according to the following equation:

$$THI = \frac{H}{H_{max}(T)}$$

wherein,
H is the average concentration of calcium carbonate of the water of the man-made swimming lagoon (2) in mg/L,
$H_{max}(T)$ is the maximum allowed concentration of calcium carbonate in mg/L at temperature T in °C., wherein T is the average temperature in °C. of the water in the at least a portion of the man-made swimming lagoon (2) and T is within $T_{Min}$ and $T_{Max}$, wherein $T_{Min}$ is a minimum allowed average temperature in °C. in the at least a portion of the man-made swimming lagoon (2) and $T_{Max}$ is a maximum allowed average temperature in °C. in the at least a portion of the man-made swimming lagoon (2),
$H_{max}(T)$ being defined according to:

$$H_{max}(T) = [CaCo_3]_{T_{Max}} - \left( \frac{[CaCo_3]_{T_{Max}} - [CaCo_3]_{T_{Min}}}{T_{Max} - T_{Min}} * (T - T_{Min}) \right)$$

wherein, $[CaCo_3]_{T_{Max}}$ is a maximum allowed hardness in mg/L for the water in the at least a portion of the man-made swimming lagoon (2) at $T_{Max}$, and
$[CaCo_3]_{T_{Min}}$ is a maximum allowed hardness in mg/L for the water in the at least a portion of the man-made swimming lagoon (2) at $T_{Min}$,
wherein, $T_{Min}$ is 25°C., $T_{Max}$ is 40°C., $[CaCo_3]_{T_{Max}}$ is 200 mg/L, and $[CaCo_3]_{T_{Min}}$ is 100 mg/L;
e. wherein the water contained within the man-made swimming lagoon (2) has a Thermo-Refraction Index (TRI) value ranging from 0 to 1 wherein the TRI is defined according to the following equation:

$$TRI = \frac{N}{8} + G + \frac{T - 25°\text{C.}}{15°\text{C.}}$$

wherein,
N is the average turbidity of the water in NTU,
G is a Grey Index defined as 1 minus the inverse of luminance (Y) divided by 100 according to $$G = 1 - \frac{Y}{100}$$

T is the average temperature of the water in the at least a portion of the man-made swimming lagoon (2) in °C.,
f. wherein, the water contained within the man-made swimming lagoon (2) has a Copper Index (COIN) value ranging from 0 to 1, wherein the COIN is defined according to the following equation:

$$COIN = \frac{[Cu]}{[Cu]_{max}(T)}$$

wherein,
[Cu] is the concentration of copper on the water of the at least a portion of the man-made swimming lagoon (2) in mg/L,
$[Cu]_{max}(T)$ is the maximum allowed concentration of copper at temperature T in mg/L,
$[Cu]_{max}(T)$ being defined according to:

$$[Cu]_{max}(T) = 1\ \text{mg/L} - \left( \frac{0.4\ \text{mg/L}}{12°\text{C.}} * (T - 28°\text{C.}) \right)$$

g. wherein, the man-made swimming lagoon (2) has a Biofilm Index (BFI) value ranging from 0 to 0.05, wherein the BFI is defined according to the following equation:

$$BFI = \left( \frac{B_t}{100\ \mu m} \right) + \left( \frac{M_l}{1000\ CFU/mL} \right) + \left( \frac{B_a}{5} \right)$$

wherein,
$B_t$ is biofilm thickness in the at least a portion of the man-made swimming lagoon (2) in μm,
$M_l$ is microbial load of the water within an area of the man-made swimming lagoon (2) in CFU/mL of total coliforms,
$B_\alpha$ is biofilm coverage area of the total inner surface of the at least a portion of the man-made swimming lagoon (2) according to:

$$B_a = \frac{\text{Inner surface covered in biofilm } [m^2]}{\text{Total inner surface } [m^2]}$$

In an embodiment, the system comprises a waste heat recirculation loop (6) comprising thermally insulated piping configured to transport a waste heat fluid from the digital processing facility (1) to the man-made swimming lagoon (2), wherein the piping includes fittings and joints adapted to withstand the temperature range of the waste heat fluid, and a pump (7).

DETAILED DESCRIPTION

Figure 1:
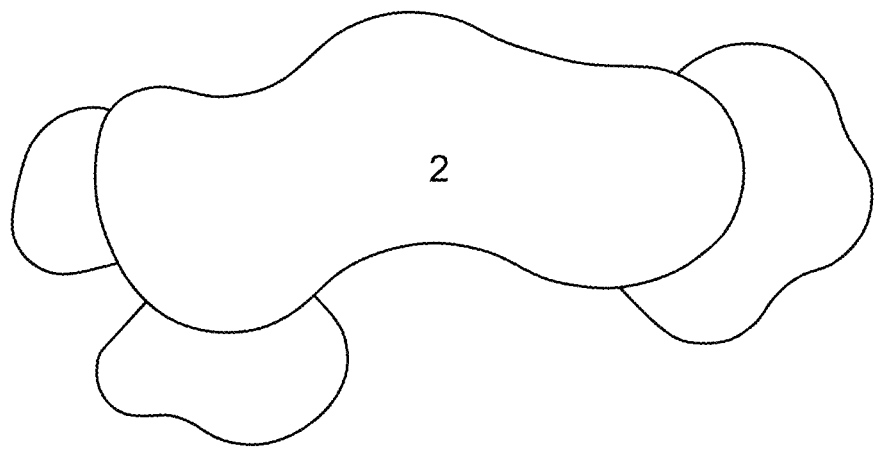
FIG. 1 is an exemplary schematic illustration of the sustainable heat transfer system of the present invention comprising a digital processing facility (1) and a man-made swimming lagoon (2) that maintains a temperature between 25° C. and 40° C. in at least a portion of the man-made swimming lagoon (2).
Figure 2:
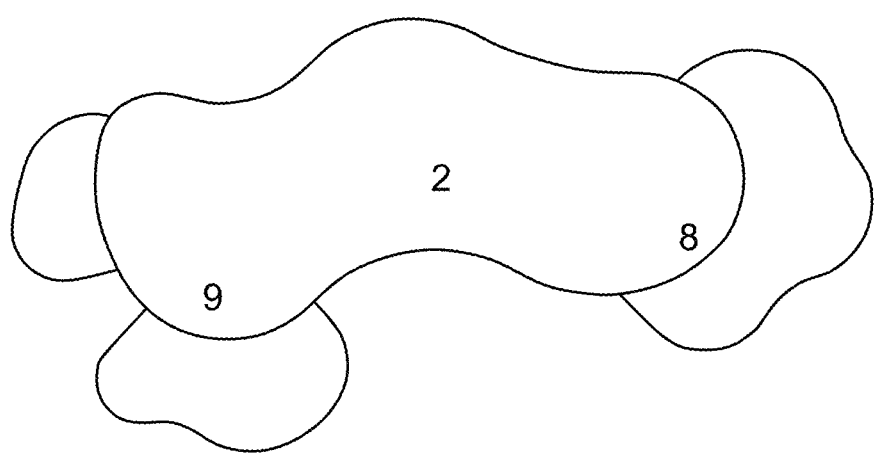
FIG. 2 is an exemplary schematic illustration of an embodiment of the sustainable heat transfer system of the present invention comprising a digital processing facility (1) and a man-made swimming lagoon (2) that comprises a tropical bathing zone (8) that maintains a temperature between 25° C. and 30° C., and a thermal water zone (9) that maintains a temperature between 30° C. and 40° C.
Figure 3:
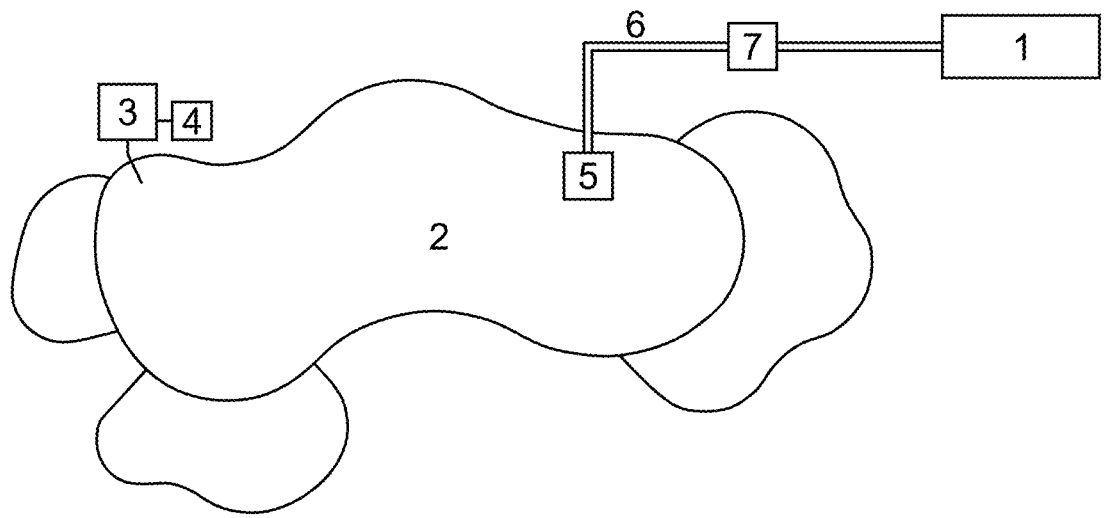
FIG. 3 is an exemplary schematic illustration of the sustainable heat transfer system of the present invention showing a HTWTS (3) that comprises an Oxidant injection unit (4), a waste heat transfer mechanism (5), a waste heat recirculation loop (6) that connects a digital processing facility (1) with the waste heat transfer mechanism (5) in a man-made swimming lagoon (2), and a pump (7).
Figure 4:
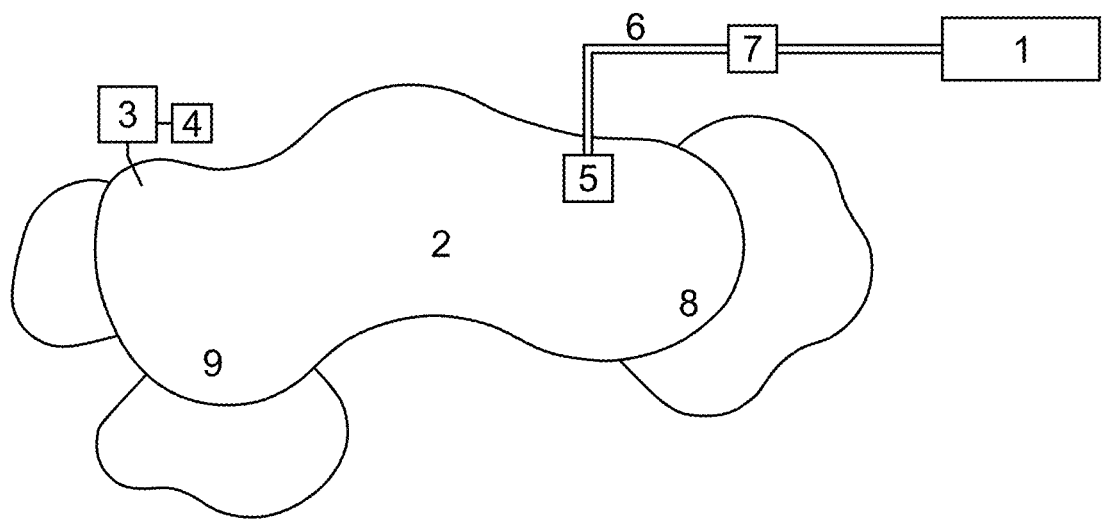
FIG. 4 is an exemplary schematic illustration of the sustainable heat transfer system of the present invention showing the HTWTS (3) that comprises an Oxidant injection unit (4), a waste heat transfer mechanism (5), a waste heat recirculation loop (6) that connects a digital processing facility (1) with the waste heat transfer mechanism (5) in a man-made swimming lagoon (2), and a pump (7), wherein the man-made swimming lagoon (2) comprises a tropical bathing zone (8) that maintains a temperature between 25° C. and 30° C., and a thermal water zone (9) that maintains a temperature between 30° C. and 40° C.
Figure 5:
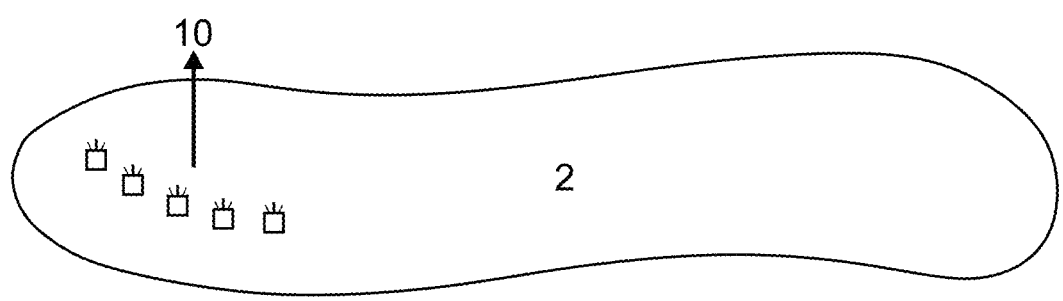
FIG. 5 is an exemplary schematic illustration of an embodiment of the sustainable heat transfer system of the present invention comprising spray nozzles (10) in a man-made swimming lagoon (2).
Figure 6:
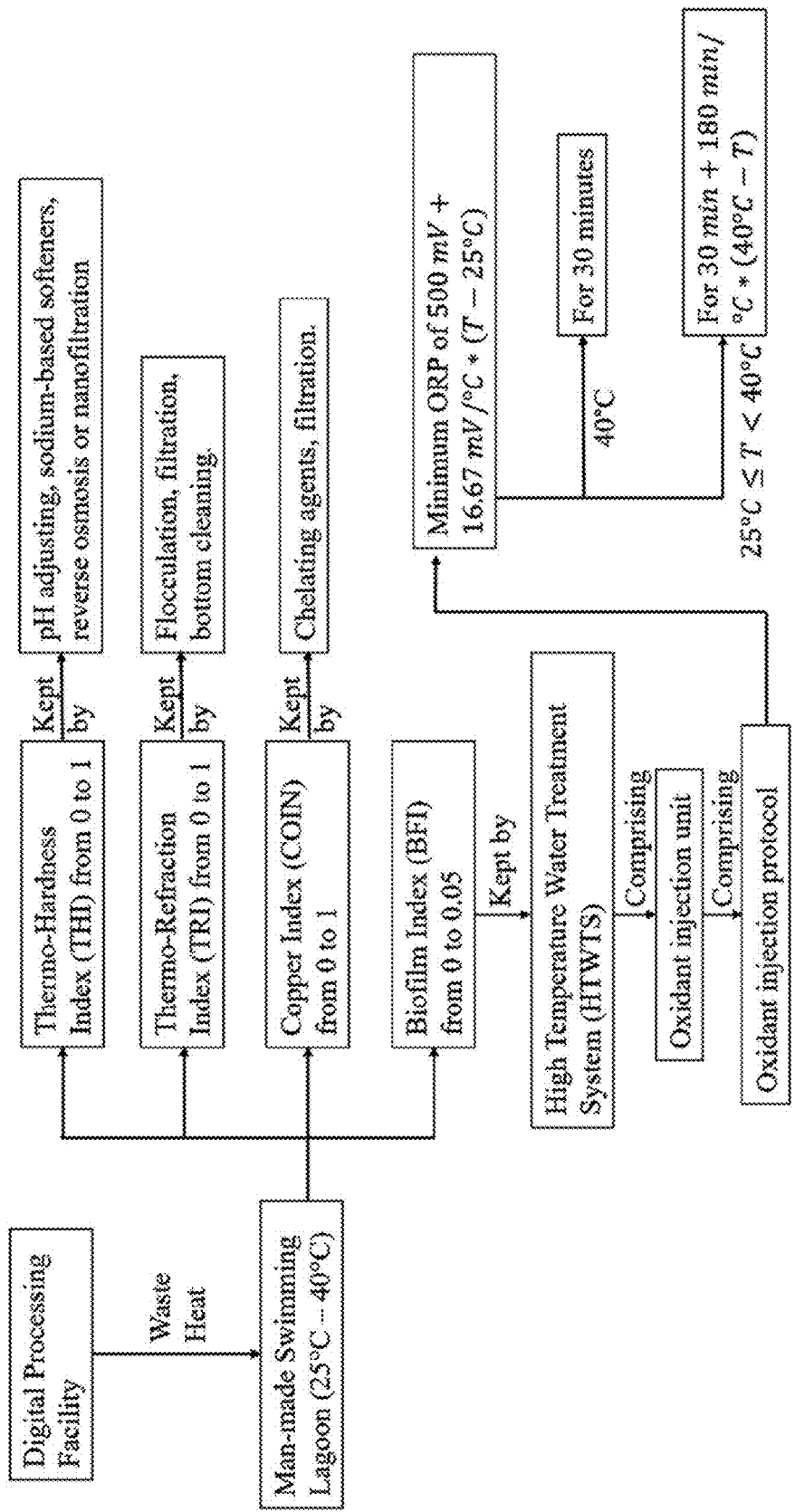
FIG. 6 is a schematic illustration of the workflow of the indexes of the present invention.

Firstly, the present disclosure relates to a sustainable heat transfer system that includes a digital processing facility (1) and a recreational man-made swimming lagoon (2) having specific biological, chemical and physicochemical standards for cooling such digital processing facility (1), the system being configured for contributing to environmental sustainability and community benefits. Secondly, the present disclosure relates to a sustainable heat transfer system that allows for the utilization of the waste heat of digital processing facilities for heating at least a portion of the man-made swimming lagoon (2). Thirdly, the present disclosure relates to a sustainable heat transfer system that includes a digital processing facility (1) and a recreational man-made swimming lagoon (2) for the heating at least a portion of the man-made swimming lagoon (2) through heat exchange, and at the same time providing cooling to such digital processing facility (1), providing even further sustainability and community benefits.

In this context, the man-made swimming lagoon (2) acts as a thermal sink, efficiently dissipating heat from the digital processing facility (1) and minimizing the reliance on cooling towers or energy-intensive chillers. Heat dissipation occurs through several mechanisms, primarily evaporation, conduction, convection, and radiation. As the water in the man-made swimming lagoon (2) absorbs heat, the water temperature rises. This generally causes an increase in the rate of evaporation, where a portion of the heat energy is transformed into latent heat, which is carried away by the evaporating water molecules. Conduction plays a role as well, where heat transfers from the warmer sections of the man-made swimming lagoon (2) to the cooler areas or to the underlying liner and soil. At the same time, radiation allows heat to escape from the surface of the water directly into the atmosphere, especially during cooler parts of the day or night. Together, these mechanisms contribute to the lagoon's ability to maintain a stable temperature and cool the water, while dissipating heat from the facility.

This combined approach of heat transfer, which provides cooling to the digital processing facility and also heats the water in the lagoon, not only reduces energy consumption but also has a lower environmental impact by significantly cutting down on the use of refrigerants and decreasing greenhouse gas emissions. Furthermore, the man-made swimming lagoon (2) provides a recreational space that enhances the quality of life for the surrounding community, transforming what would traditionally be a purely industrial cooling solution into a multi-functional asset. This integration of cooling and community usage represents a unique opportunity to balance digital processing facility efficiency with environmental and social benefits, demonstrating the viability of innovative approaches to sustainable digital processing facility operations.

It is important to note that current uses of heat export for datacenters and other facilities relates to the use of waste heat, but not to the actual cooling of such facility. In District Heating processes, waste heat is generally used to pre-heat the water that is then used for district heating, with no focus on allowing a combined use for also cooling such datacenter or facility. In other heating processes, the use of waste heat is very limited and small amounts are used, and therefore such processes do not provide an efficient cooling solution to the datacenters or similar facilities. Therefore, the present disclosure allows, in a sustainable manner, to provide a heat transfer system that includes a recreational man-made swimming lagoon (2) for cooling a digital processing facility, and through such process at least a portion of the lagoon is heated to temperatures dependent on the digital processing facility, and therefore the system contributes to environmental sustainability and community benefits by providing an efficient cooling system as well as reusing waste heat within the same recreational lagoon.

Further, as previously mentioned, there are a few examples of conventional small-sized commercial swimming pools that are heated by digital facilities' waste heat, which are mostly enclosed pools (located in indoor spaces). However, these are very small pools that from an aesthetic and functional perspective do not provide the tropical ambiance and do not allow the practice of water sports. Such pools cannot achieve the adequate temperature gradient to provide cooling to medium-scale datacenters (of at least 0,3 MW of IT power), given their small surfaces and volumes that cannot dissipate the waste heat from a digital facility, as well as being in enclosed spaces and therefore not achieving the evaporation and heat dissipation rates to provide cooling to the digital facilities. Given that swimming pools have very high construction and operation costs, it is not suitable to build very large pools to provide cooling to larger scale datacenters, which are being developed all around the world. Further, a tempered pool heated by a digital facility does not have any difference in use when compared to a conventional pool. In contrast, a man-made swimming lagoon allows for many different purposes and activities that are not suited for small pools.

On the other hand, to provide cooling to medium-to-large scale datacenters (of at least 0,3 MW of IT power, 1 MW, 5 MW, 10 MW, 20 MW, 50 MW or more), larger water bodies are needed. In this case, if natural or man-made lakes or ponds were used (which have high turbidity and poor water quality), then cooling would be inefficient and there is potential eutrophication of such water bodies given the higher temperatures of the water and the combination with nutrients and organic particles. Further, the cooling systems would suffer from many problems given the growth of biofilm, clogging of the cooling systems' pipes, pump, heat exchangers and other equipment, further affecting their cooling capacity.

The present disclosure allows providing a solution and alternative to this issue, given the ability of these man-made swimming lagoons with large surfaces that allow to provide cooling to larger scale datacenters, of up to 50 MW, 100 MW or larger datacenters with a cost efficient and sustainable solution, that also allows to create a heated swimming lagoon for recreational purposes, generating a revolution in the recreational, datacenter, and cooling systems markets. A large man-made swimming lagoon that is heated by using waste heat from a digital facility (such as a datacenter) and that also provides cooling to such datacenter, achieves a synergy unreachable by other systems or processes, creating a breakthrough on the urban recreation market, allowing to bring heated idyllic beaches and tropical-ocean like views and activities to urban centers around the world.

DEFINITIONS

Unless otherwise defined, all terms used herein have the same meaning as commonly understood by one of ordinary skill in the art to which this invention belongs. The following terms are intended to be defined as indicated below for the purposes of the present disclosure.

The term "man-made swimming lagoon" as used herein refers to an artificially constructed lagoon with a water surface of at least 3,000 m$^2$, which mimics tropical beach life locations. These lagoons are designed for recreational purposes, offering amenities for swimming, water sports, and other leisure activities, while maintaining controlled water quality, temperature, and aesthetic features to replicate natural aquatic settings. The man-made swimming lagoons are not designed nor operated as conventional swimming pools as previously defined, including not using a full concrete shell that is painted.

The term "waste heat" as used herein refers to thermal energy that is a byproduct of the operation of an industrial or commercial process, such as those generated by digital processing facilities, power plants, or manufacturing systems. Waste heat is typically produced when energy is consumed to perform tasks like computing, machinery operation, or electricity generation, and is often released into the environment without being fully utilized. This excess heat, while considered a byproduct, can still carry significant amounts of thermal energy, which, if left unmanaged, may contribute to environmental inefficiency and require additional cooling resources. Waste heat in digital processing facilities typically exists in the form of low-grade heat, which relates to heat with relatively low temperature compared to primary heat sources, but that can still be valuable for applications such as water heating.

The term "carbon credits" as used herein refers to certificates that represent one ton of carbon dioxide ($CO_2$) or the equivalent amount of another greenhouse gas that was not generated. These credits are part of initiatives for controlling greenhouse gas emissions, where entities that reduce their emissions below a certain baseline can earn carbon credits and sell them to other entities. Carbon credits can be generated through various means, such as the implementation of energy-efficient technologies, renewable energy projects, or systems like a sustainable heat transfer system, which reduce carbon emissions by lowering energy consumption and repurposing waste heat.

The term "direct contact recreational activities," as used herein, encompasses any recreational activities in which participants are in direct physical contact with the water of the man-made swimming lagoon (2). Direct contact activities also include scenarios where individuals are partially or fully submerged in the water. Direct contact activities comprise, but are not limited to, swimming, wading, diving, snorkeling, surfing, water aerobics, paddleboarding, bodyboarding, water polo, synchronized swimming, free diving, windsurfing, kiteboarding, aqua jogging, underwater photography, spearfishing, rafting, floating, hydrotherapy, underwater welding, open-water rescue training, and any other water activity in which a person comes into direct-contact with the man-made swimming lagoon (2) water.

The term "suspended particle" as used herein encompasses a broad spectrum of entities present in water, ranging from visible particulates to microscopic entities, including but not limited to microorganisms and molecular structures. This definition is comprehensive, capturing entities even at the molecular level, such as metals in their non-oxidized form. Suspended particles can originate from various sources and can be composed of organic or inorganic materials. Their presence in water often contributes to its turbidity and color, affecting clarity and aesthetics and potentially its safety for recreational activities.

Biologically-derived suspended particles encompass a spectrum of microorganisms. Algae, for instance, are photosynthetic organisms that can proliferate in water under certain conditions, imparting a tint and turbidity to the water body. Similarly, various bacteria can exist as suspended entities in the water. These microorganisms, while some are harmless, others can pose health risks, especially when water is intended for recreational activities. Protozoa and certain minute aquatic plants and animals also contribute to the biological faction of suspended particles.

DETAILED DESCRIPTION

The sustainable heat transfer system from the present disclosure comprises a man-made swimming lagoon (2) with a water surface of 3,000 m$^2$ to 1,000,000 m$^2$, preferably of 50,000 m$^2$ to 1,000,000 m$^2$, more preferably of 100,000 m$^2$ to 1,000,000 m$^2$, and more preferably of 200,000 m$^2$ to 1,000,000 m$^2$.

The man-made swimming lagoon (2) is configured and arranged to receive waste heat from the digital processing facility (1), the facility having a capacity from about 00.3 MW to about 1 MW, more preferably from about 1 MW to about 10 MW, more preferably from about 10 MW to about 50 MW, more preferably from about 50 MW to about 100 MW, more preferably from about 100 MW to about 500 MW, and even more preferably from about 500 MW to about 1 GW. The capacity of the facility refers to the electricity consumption for the digital processing facility (1). In the case of data centers, the capacity refers to the IT equipment electricity consumption.

The man-made swimming lagoon (2) receives waste heat so that the water in at least a portion of the man-made swimming lagoon (2) is heated to a temperature between 20° C. and 45° C., preferably between 20° C. and 43° C., preferably between 23° C. and 41° C., and most preferably between 25° C. and 40° C.

At least a portion of the lagoon is heated so different zones can be created, wherein a tropical bathing zone (8) of the man-made swimming lagoon (2) is heated to a temperature between 20° C. and 35° C., more preferably between 25° C. and 30° C., and a thermal water zone (9) is heated to a temperature between 30° C. and 45° C., more preferably between 33° C. and 41° C., and most preferably between 30° C. and 40° C. . . . Such temperatures can also be maintained for a period of time during the year based on seasonal usage of the man-made swimming lagoon (2), or for specific events and other activities. The man-made swimming lagoon (2) allows direct-contact recreational activities and water sports. In another embodiment of the disclosure, the man-made swimming lagoon (2) is configured to allow surfing purposes, with the use of artificial surf wave generators.

In an embodiment of the invention, the man-made swimming lagoon (2) comprises multiple zones, with at least two different zones having different average temperatures within the man-made swimming lagoon (2). The different temperature zones are created throughout the man-made swimming lagoon (2) through the use of partial physical barriers.

In another embodiment of the invention, a man-made swimming lagoon (2) with at least two different temperature zones is created, wherein the two zones are created by using partial physical barriers that allow partially confining the volumes and creating a delimitation between both water volumes, such that the mixing and flows in each water volume allow for maintaining different average temperatures in such different zones. The partial barriers are designed and configured to achieve the different temperature zones and installed within the man-made swimming lagoon (2), and comprise shapes and materials that allow to create the different zones in a safe manner.

In an embodiment of the invention, the barriers are configured to create at least two zones that are adjacent to each other, and therefore take advantage of the waste heat leaving one zone to heat the other.

The partial barriers allow to create an innovative concept with a large lagoons with multiple different temperature zones, where the partial barriers have many advantages such as (i) the partial barriers allow concentrating and the waste heat and hot-water flows that are introduced into such temperature zone, and (ii) the partial barriers allow to maintain higher temperatures in such zones than in other zones or the rest of the lagoon's water volume. Therefore, the use of barriers allows to generate different zones with different temperatures, that can be used for different purposes, such as for swimming, practicing water sports, therapeutic purposes, industrial purposes, among others.

In an embodiment of the invention, the different temperature zones have average temperatures that are different. In an embodiment of the invention the difference between the average temperature of two different zones is at least 4° C. for at least 30 days. In an embodiment of the invention, the different temperature zones can maintain a homogeneous temperature within such volume, or can have a water volume with a temperature gradient within the same zone.

In an embodiment of the invention, the partial barriers allow to also modify the path of the water flow flowing through the man-made swimming lagoon (2) between its inlet and outlet points, and can be used to provide a longer travel path or shorter travel path of the water flow, which impacts the cooling capacity (heat dissipation capacity) of the man-made swimming lagoon (2).

In an embodiment of the invention, at least one portion of water within the man-made swimming lagoon (2) that is heated has a surface area of at least 40 m². As previously indicated, such portion of water may be partially delimited by a partial barrier.

By maintaining the man-made swimming lagoon's water (or a portion of it) at these temperatures, not only is efficient heat dissipation achieved, but it also provides a comfortable environment for swimming and other water-based recreational activities. The constant availability of warm water ensures year-round usability, which is particularly advantageous in colder seasons or colder climates where natural water bodies may not be suitable or comfortable for direct contact recreation. Furthermore, during hotter seasons or in warmer climates, provision of the thermal water zone (9) creates a new thermal lagoon amenity that previously did not exist, offering an inviting area for relaxation and potential therapeutic use. This unique approach also promotes tourism and local economic growth by attracting visitors to the man-made swimming lagoon (2), further enhancing community engagement and providing economic benefits. By creating an unparalleled amenity, this system brings the essence of tropical beach life to any corner of the world, transforming even the most unlikely locations into sought-after destinations.

The man-made swimming lagoon (2) mimics the soothing warmth and vibrant atmosphere of a coastal paradise. Visitors are immersed in a resort-like experience, with sun-soaked waters that evoke the feeling of an endless summer, no matter the climate. The natural-feeling warmth of the lagoon, fueled by the heat transfer process, seamlessly merges luxury and sustainability, turning local communities into global attractions while simultaneously reducing environmental impact. In this manner, the system reduces the overall thermal footprint of the digital processing facility (1) by efficiently transferring heat into the man-made swimming lagoon (2) rather than relying in conventional systems, which helps mitigate urban heat island effects. Furthermore, the lagoon's use of waste heat exemplifies an energy recycling process that turns a potential byproduct into a community benefit, demonstrating an effective use of resources that aligns with both environmental sustainability and public welfare goals.

Therefore, it is important to note that some of the advantages of using the present disclosure include: (a) Energy savings related to not using chillers, which are energy intensive and can consume between 40-50% of the total energy consumed by a datacenter to provide cooling for such facility, (b) increase the Power Usage Effectiveness (PUE) of the datacenter, which relates to the rate of energy consumption of the IT equipment to the total energy consumption of the facility, including cooling systems, (c) provides high quality cooling water to the facility, minimizing biofouling and scaling, (d) allows for the use of waste heat, where the recreational lagoon is heated without the use of additional energy, (e) it allows lowering carbon footprint by bringing beach life with heated waters near homes and urban centers, reducing travel needs, (f) can be combined with the use of carbon credits and other financial incentives, (g) can improve the public image of the datacenter or similar processing facility, and (h) can facilitate approval of such projects from a regulatory perspective.

The man-made swimming lagoon (2) comprises a bottom covered with a non-permeable material selected from the group comprising plastic liners, shotcrete, or flexible materials. These materials are chosen to ensure that water leakage is minimized, thereby maintaining the lagoon's water level. Plastic liners, for instance, provide a cost-effective solution with high durability and ease of installation, whereas shotcrete offers a more robust structure. Flexible materials can adapt to the natural terrain, making them suitable for irregularly shaped lagoons. In contrast, conventional swimming pools often use materials which are not as efficient for making irregularly shaped areas. For example, painted concrete, although widely used in conventional pool construction, can be significantly more costly due to the labor-intensive installation process, the need for reinforcement, the extensive formwork required for complex shapes, as well as the cost and time intensive requirements for painting and re-painting such concrete shell periodically, which would also not be compatible with paralyzing or stopping the operation of the digital facility, as it may affect its availability. Additionally, in large surfaces, concrete is also prone to cracking over time due to ground movement or temperature fluctuations, which can lead to water leakage issues and require costly repairs or resurfacing to maintain the integrity of the man-made swimming lagoon (2) structure, also affecting the paint work of such inner surface. These disadvantages make painted concrete a less desirable option when designing large-scale or naturally contoured lagoons that aim for efficient, long-term heat retention and minimal maintenance. The materials selected for the lagoon contribute to its adaptability and efficiency, making it better suited for the dual purpose of recreational use and digital processing facility cooling compared to traditional swimming pool designs. Examples of non-permeable materials include, but are not limited to High-Density Polyethylene (HDPE), Low-Density Polyethylene (LDPE), Linear Low-Density Polyethylene (LLDPE), Polyvinyl Chloride (PVC), Ethylene Propylene Diene Monomer (EPDM), Chlorosulfonated Polyethylene (CSPE), Reinforced Polyethylene (RPE), Polypropylene (PP), Polyurethane (PU), Geomembrane Composite Liners, Polyvinyl Alcohol (PVA), Polyethylene Terephthalate (PET), Flexible Polyethylene (FPE), Ethylene Vinyl Acetate (EVA), and Polyisobutylene (PIB).

Further, cost is a very important factor to consider in the evaluation and definition of these systems. OPEX (operating expenditures) and CAPEX (capital expenditures) are critical considerations when assessing the costs of conventional swimming pools. Operating expenditures include the ongoing expenses related to the daily functioning of the pool, such as energy consumption for pumps or filters can be substantial. Water treatment is another major factor, as pools require regular use of chemicals like chlorine and pH balancers, along with water testing to maintain safety standards. Water replenishment is also necessary due to losses from evaporation, backwashing, and splash-out, contributing to ongoing water costs. The pool's structure, such as pools using tiles on top of the concrete shell or painting over the concrete, also need periodic maintenance to prevent leaks or aesthetic deterioration. On the other hand, capital expenditures (CAPEX) encompass the initial investments required for the construction and setup of the pool. These include excavation, plumbing, concrete work, and the installation of necessary equipment like pumps, heaters, and filtration systems. Additional expenses include landscaping, fencing, and design fees, as well as obtaining the necessary permits and ensuring compliance with local regulations. Overall, conventional swimming pools incur significant construction and ongoing operation costs for both operation and initial setup. In comparison, man-made swimming lagoons offer a far more advantageous solution in terms of costs, with significantly reduced construction, operational and energy requirements, all while providing a larger, more sustainable, and aesthetically appealing experience.

As previously disclosed, the man-made swimming lagoon (2) from the present disclosure has specific biological, chemical and physicochemical standards, and it has features and parameters that contribute to being able to provide a cooling source and at the same time heat the water in the man-made swimming lagoon (2), as well as maintaining higher water temperatures while providing a safe and sanitary body of water for direct contact recreational purposes. This is achieved by a series of indexes related to the properties of the water within the man-made swimming lagoon (2), such as the Thermo-Hardness Index (THI), the Thermo-Refraction Index (TRI), the Copper Index (COIN), and the Biofilm Index (BFI).

Thermo-Hardness Index (THI)

Calcium carbonate incrustations in man-made swimming lagoons tend to increase with rising water temperatures due to its decrease in solubility. As temperature rises, calcium carbonate becomes less soluble, which leads to an increased tendency to its precipitation and to form solid deposits on lagoon surfaces and piping systems. This effect is particularly pronounced at higher temperatures, where the precipitation process becomes more favorable, leading to the rapid formation of scale. Additionally, the higher temperatures promote evaporation, concentrating dissolved calcium carbonate and other minerals in the remaining water, which further exacerbates the conditions conducive to incrustation. These temperature-driven processes make effective management of incrustations a critical aspect of maintaining the efficiency and longevity of lagoon systems when water temperatures are elevated for prolonged periods. The Thermo-Hardness index is only used and relevant for man-made swimming lagoons using fresh water, wherein fresh water is defined as water having a total dissolved solid (TDS) concentration of up to 1,500 ppm. For water with TDS higher than 1,500 ppm, the THI is not measured nor required.

The Thermo-Hardness Index (THI) is an index used to maintain the hardness in terms of calcium carbonate of water under established amounts on determined temperatures, and the THI is defined according to the following equation:

$$THI = \frac{H}{H_{max}(T)}$$

wherein,

H is the average concentration of calcium carbonate of the water of the man-made swimming lagoon (2) in mg/L, $H_{max}(T)$ is the maximum allowed concentration of calcium carbonate in mg/L at temperature T in °C., wherein T is the average temperature in °C. of the water in the at least a portion of the man-made swimming lagoon (2) and T is within $T_{Min}$ and $T_{Max}$, wherein $T_{Min}$ is a minimum allowed average temperature in °C. in the at least a portion of the man-made swimming lagoon (2) and $T_{Max}$ is a maximum allowed average temperature in °C. in the at least a portion of the man-made swimming lagoon (2), $H_{max}(T)$ being defined according to:

$$H_{max}(T) = [CaCo_3]_{T_{Max}} - \left(\frac{[CaCo_3]_{T_{Max}} - [CaCo_3]_{T_{Min}}}{T_{Max} - T_{Min}} * (T - T_{Min})\right)$$

And wherein the Thermo-Hardness index is only used and relevant for man-made swimming lagoons using water having a total dissolved solid concentration of up to 1,500 ppm.

wherein, $[CaCo_3]T_{Max}$ is a maximum allowed hardness in mg/L for the water in the at least a portion of the man-made swimming lagoon (2) at $T_{Max}$, and $[CaCo_3]T_{Min}$ is a maximum allowed hardness in mg/L for the water in the at least a portion of the man-made swimming lagoon (2) at $T_{Min}$.

In embodiments, $T_{Min}$ is 20° C., more preferably 21° C., more preferably 22° C., more preferably 23° C., more preferably 24° C., and most preferably 25° C. and $T_{Max}$ is 45° C., more preferably 44° C., more preferably 43° C., more preferably 42° C., more preferably 41° C., and most preferably 40° C.

According to the present invention, the water within the man-made swimming lagoon (2) has a Thermo-Hardness Index (THI) value from 0 to 1. In embodiments, the $[CaCo_3]T_{Max}$ is 200 mg/L, more preferably 175 mg/L, and most preferably 150 mg/L the $[CaCo_3]T_{Min}$ is 125 mg/L, more preferably 115 mg/L, and most preferably 100 mg/L. This formula helps determine if the water is in a balanced state, providing insight into whether it may lead to scaling. This range is crucial for minimizing the risk of incrustation, as a THI value within 0 and 1 indicates that the water is in an acceptable state, not prone to scale formation. Calcium carbonate, which is a common contributor to scaling, is managed effectively within this THI range, reducing the buildup of deposits that could impair the flow of the system, heat exchange efficiency, and safety of the man-made swimming lagoon (2). By maintaining these levels, the system ensures optimal performance, preventing the formation of calcium carbonate scale incrustations, which could otherwise lead to increased maintenance costs and reduced cooling efficiency.

THI is specifically tailored to determine the maximum allowed hardness at the specific $T_{Min}$–$T_{Max}$ range. If the temperature of the water in the man-made swimming lagoon (2) falls outside the defined range, the THI calculation does not apply as designed. For temperatures outside the $T_{Min}$–$T_{Max}$ range, the THI isn't calculated since the index is designed for the temperature conditions of the present invention.

The temperature and calcium carbonate concentration of the water in at least a portion of the man-made swimming lagoon (2) is periodically measured. Various measurement techniques may be employed for measuring the calcium carbonate concentration. These include colorimetric test kits, portable digital meters or probes, Atomic Absorption Spectrophotometry (AAS), Inductively Coupled Plasma Mass Spectrometry (ICP-MS), Inductively Coupled Plasma Optical Emission Spectroscopy (ICP-OES), and X-Ray Fluorescence (XRF), other laboratory tests, among others. In this manner, only make-up water with calcium carbonate concentrations that would not change the THI out of the 0-1 range is introduced.

Furthermore, if levels of THI outside the range 0-1 are measured in the water of the man-made swimming lagoon (2), the system of the present invention is configured for performing several actions to control the calcium carbonate concentration, such as adjusting the water's pH through controlled $CO_2$ injection, filtration and mechanical cleaning, addition of sodium-based softeners, softening processes, reverse osmosis or nanofiltration, among others.

For example, if a THI value over 1 is detected, corrective measures can be applied. In this scenario, a portable digital meter may indicate a calcium carbonate concentration of 500 mg/L at a temperature of 30° C., which exceeds the THI's upper limit for this temperature. To bring it back within the acceptable range, adjusting the pH through controlled $CO_2$ injection may be applied. This approach allows the calcium carbonate concentration to return to acceptable levels, thereby preventing potential incrustation and safeguarding the lagoon's infrastructure and water quality.

Thermo-Refraction Index (TRI)

The turquoise color of tropical seas is often admired for its aesthetic beauty and is closely associated with relaxation and the ideal beach experience, making it highly desirable for man-made swimming lagoons. The man-made swimming lagoon (2) of the present invention achieves this characteristic turquoise color through a combination of physical factors involving refraction, turbidity, and the color of the lagoon's bottom material. Refraction plays a significant role in the lagoon's visual appearance. As sunlight enters the water, it bends, or refracts, causing certain wavelengths of light to scatter more than others. In this case, shorter wavelengths of light, particularly blue and green, are scattered and reflected back to the surface, while longer wavelengths like red are absorbed. This scattering of shorter wavelengths gives the water its distinct turquoise hue when viewed from above. Turbidity also affects the water's color. The turbidity of the lagoon is kept low, meaning the water contains very few suspended particles or impurities. Low turbidity allows light to penetrate deeper into the water, enhancing the scattering of blue and green wavelengths. High turbidity, on the other hand, would result in murky or clouded water, which would diminish the clarity and intensity of the turquoise color. Further, the color of the bottom material is an essential factor.

The man-made swimming lagoon (2) is constructed with a light-colored liner at the bottom, typically with shades of white, cream, or light blue colors. In an embodiment of the invention, the liner is used over a shotcrete shell and/or slab. This liner reflects sunlight back through the water column, amplifying the turquoise appearance. The reflection of light from the bottom, combined with the natural scattering effects of refraction, creates a bright, glowing bluish color that is characteristic of tropical lagoons. A darker or more neutral-colored bottom would not reflect light as effectively, resulting in a duller appearance. Moreover, sediment accumulates in the bottom surface over time. Sediment thickness is an important contributing factor that affects the color of the bottom surface that can be controlled by periodically cleaning the bottom surface through suction devices.

The vibrant turquoise hue, which results from the scattering of sunlight by shallow, clear waters, evokes a sense of calm and enhances the recreational quality of a lagoon, contributing to a pleasant environment that people seek for enjoyment and leisure. However, maintaining this distinctive turquoise color presents a significant challenge when the lagoon's water temperature is elevated. At higher temperatures, there is an increased likelihood of darkening of the bottom of the man-made swimming lagoon (2) and increase in turbidity, given that microbial growth is promoted at higher temperature, and that oils from bathers dilute more easily. This can lead to a loss of clarity and a shift away from the desired turquoise color, potentially compromising the lagoon's visual appeal. Therefore, controlling the bottom color, and reducing turbidity, through the measuring and monitoring of these conditions using advanced indexes, and for example, by performing flocculation, suction, filtration, and chemical treatment, are crucial to preserving this attractive tropical aesthetic, especially in conditions where water temperatures are high.

In this context, the Thermo-Refraction Index (TRI) is defined according to the following equation:

$$TRI = \frac{N}{8} + G + \frac{T - 25° \text{ C.}}{15° \text{ C.}}$$

wherein,

N is the average turbidity of the water in NTU,

G is a Grey Index defined as 1 minus the inverse of luminance (Y) value in the CIE 1931 color space, under standardized D65 illumination, divided by 100. The luminance (Y) value represents the brightness of the bottom surface, where Y=100 corresponds to a perfectly white surface, and Y=0 corresponds to a perfectly black surface. G corresponds to the equation:

$$G = 1 - \frac{Y}{100}$$

T is the average temperature of the water in the at least a portion of the man-made swimming lagoon (2) in ° C., Each component of the TRI equation has been specifically tailored to assess the influence of different factors on the lagoon's overall quality as a recreational swimming lagoon, its safety and the cooling efficiency of the sustainable heat transfer system. The man-made swimming lagoon (2) is configured to have a Thermo-Refraction Index (TRI) value ranging from 0 to 1. Maintaining the water of the man-made swimming lagoon (2) on a TRI in the specified range of 0 to 1, allows to keep these factors in optimal conditions and resembling a tropical sea. The temperature factor evaluates how high the water temperature is, considering a most extreme acceptable temperature of 40° C. for the TRI, ensuring efficient heat absorption and dissipation, and further ensuring comfort for most swimmers, balancing the warmth needed for relaxation and activity without becoming too hot, which could be uncomfortable or even unsafe. The turbidity of the water, in Nephelometric Turbidity Units (NTU), measures the cloudiness of the water, meaning how much light is scattered by particles suspended in the water. High levels of turbidity, over 8 NTU for example, affect the safety and visual aspect of the man-made swimming lagoon (2), which also contributes to the recreational quality, and relates to the number of suspended particles which further influence overall cooling performance. Lastly, the luminance (Y) value represents the brightness of the bottom surface, where Y=100 corresponds to a perfectly white surface, and Y=0 corresponds to a perfectly black surface. The luminance further impacts the visual aspect of the man-made swimming lagoon (2), which contributes to the recreational quality by providing a light bottom which reflects sunlight effectively, scattering light throughout the water column, and results in the water taking on a turquoise hue similar to that of a tropical sea. This effect is crucial to achieving the desired visual aesthetic, as the bright, reflective surface enhances the clarity and color of the water, giving it that iconic tropical appearance.

To determining turbidity in the man-made swimming lagoon (2), nephelometer can be employed. This device operates by projecting a beam of light through a water sample and then measuring the intensity of light scattered at a 90-degree angle from the beam. The scattered light results from particles suspended in the water, with higher turbidity correlating to more scattering and higher NTU readings. The NTU of the water sample is compared to a standard sample of known NTU. Water samples are collected at various depths and points across the man-made swimming lagoon (2) to capture a comprehensive picture of the water's turbidity levels. Other measurement techniques can be employed such as gravimetrically measuring the amount of solids on water samples, laser particle counting, among others.

The determining of luminance, or brightness of the lagoon's bottom surface, can be performed by photometer measurement to directly measure the amount of light reflected from the lagoon's bottom surface, employing a dedicated luminance meter, which calculates the brightness of surfaces, by capturing high-resolution images of the lagoon's bottom surface using a digital camera and then analyzing these images with software calibrated for luminance measurement to determine brightness levels, utilizing a spectroradiometer to measure both the intensity and wavelength of light reflected from the lagoon's bottom, placing contrasting reference objects or surfaces with known luminance values on the lagoon's bottom and visually comparing their brightness to approximate luminance levels, among others.

By incorporating these parameters, the TRI provides a comprehensive evaluation of the lagoon's cooling potential, safety, and recreational quality, ensuring that all critical factors are considered to maintain an optimal environment for both digital processing facility cooling and recreational use. Methods for maintaining the TRI include flocculation, bottom filtering, central filtering, chemical treatment, among others. This tailored approach helps to effectively balance environmental influences, maximizing the lagoon's efficiency and minimizing potential negative impacts on performance.

For example, in a man-made swimming lagoon (2) situated in a hot and dry climate, high sedimentation and turbidity levels are frequent due to surrounding soil and wind conditions. In this scenario, for maintaining the TRI, a combination of bottom filtering and flocculation could be implemented. By doing so, the lagoon's water clarity and bottom color is maintained according to the TRI.

This approach represents a significant innovation. By synergistically combining temperature, turbidity, and luminance, the present system introduces a novel solution that substantially enhances digital processing facility cooling, water quality, and safety. The TRI synergizes the contribution of all these parameters, providing a more accurate understanding of the water's suitability for cooling and recreational purposes simultaneously. By considering these parameters together, it is possible to identify and modify water conditions that might go unnoticed when evaluating them individually. The integrated approach ensures that the water maintains optimal conditions for heating, and an appealing visual quality while adhering to strict health and safety standards.

Copper Index (COIN)

Copper incrustations in man-made swimming lagoons tend to increase with rising water temperatures due to a combination of chemical and physical processes that become more pronounced at elevated temperatures. As the temperature of the water rises, copper solubility changes, and the rate of chemical reactions involving copper increases, leading to a greater likelihood of copper ions precipitating out of solution and forming deposits. Additionally, warmer temperatures can accelerate oxidation processes, causing copper to react with other substances in the water, such as carbonates and sulfates, which leads to the formation of copper-containing compounds that adhere to surfaces. These incrustations are often exacerbated in heated environments, where evaporation further concentrates dissolved copper, enhancing the conditions for deposition. Therefore, maintaining water quality and controlling temperature are crucial steps in minimizing the formation of copper incrustations and preventing damage or discoloration to lagoon surfaces and equipment.

In this context, the Copper Index (COIN) is defined according to the following equation:

$$COIN = \frac{[Cu]}{[Cu]_{max}(T)}$$

wherein,

T is the average temperature of the water in the at least a portion of the man-made swimming lagoon (2) in ° C.,

[Cu] is the concentration of copper on the water of the at least a portion of the man-made swimming lagoon (2) in mg/L, $[Cu]_{max}(T)$ is the maximum allowed concentration of copper at temperature T in mg/L, $[Cu]_{max}(T)$ being defined according to:

$$[Cu]_{max}(T) = 1\ mg/L - \left(\frac{0.4\ mg/L}{12°\ C.} * (T - 28°\ C.)\right)$$

The copper concentration in all water sources introduced into the man-made swimming lagoon (2), as well as in any chemical additives, is meticulously monitored to ensure that the COIN remains within the defined range of 0 to 1 for the man-made swimming lagoon (2). Various measurement techniques may be employed for measuring the copper concentration. These include colorimetric test kits, portable digital meters, Atomic Absorption Spectrophotometry (AAS), Inductively Coupled Plasma Mass Spectrometry (ICP-MS), Inductively Coupled Plasma Optical Emission Spectroscopy (ICP-OES), and X-Ray Fluorescence (XRF). This comprehensive approach ensures precise control over copper levels, preventing incrustation and protecting the lagoon's surfaces and equipment. Methods for adjusting the copper concentration in the water of the man-made swimming lagoon (2) include chelation, filtration, among others.

For instance, if copper levels are detected to exceed the target range according to a COIN value between 0 and 1, corrective measures such as chelation can be applied. In this scenario, a portable digital meter may indicate a copper concentration of 1.2 mg/L at a temperature of 30° C., which exceeds the COIN's upper limit for this temperature of 0.93 mg/L. To bring it back within the acceptable range, chelating agents can be introduced to bind and neutralize free copper ions. Examples of commonly used chelating agents are HEDP (1-Hydroxyethylidene-1,1-diphosphonic acid), DTPMP (Diethylenetriaminepentamethylenephosphonic acid), Ascorbic Acid, Polyacrylate-Based Chelators, Citric Acid, among others. This approach allows the copper concentration to return to safe levels, thereby preventing potential incrustation and safeguarding the lagoon's infrastructure and water quality.

Biofilm Index (BFI)

Biofouling is the unwanted accumulation of microorganisms, algae, and other biological matter on submerged surfaces, and it is a significant issue in all types of piping, particularly in man-made swimming lagoons. This process occurs when microbial communities adhere to surfaces, forming a biofilm that can eventually lead to reduced water clarity, undesirable odors, damage to piping material, reduced functionality of heat exchangers and increased maintenance costs. Biofouling not only affects the appearance of the lagoon but can also impair water circulation systems and reduce the overall efficiency of water treatment processes. The problem of biofouling becomes more pronounced at higher temperatures, as warmer water promotes faster microbial growth and reproduction, accelerating the formation of biofilms. Elevated temperatures also create a more favorable environment for certain species of algae and bacteria, which thrive in warmer conditions, leading to increased biological activity and the rapid colonization of submerged surfaces. As such, managing biofouling becomes increasingly challenging in higher-temperature environments.

In this context, the Biofilm Index (BFI) is defined according to the following equation:

$$BFI = \left(\frac{B_t}{100\ \mu m}\right) + \left(\frac{M_l}{1000\ CFU/mL}\right) + \left(\frac{B_a}{5}\right)$$

wherein, $B_t$ is biofilm thickness in the at least a portion of the man-made swimming lagoon (2) in μm, $M_l$ is microbial load of the water within an area of the man-made swimming lagoon (2) in CFU/mL of total coliforms, $B_\alpha$ is biofilm coverage area of the total inner surface of the at least a portion of the man-made swimming lagoon (2) according to:

$$B_a = \frac{\text{Inner surface covered in biofilm}\ [m^2]}{\text{Total inner surface}[m^2]}$$

Each variable in the BFI equation represents a key aspect of biofilm development that affects water quality and lagoon maintenance. The man-made swimming lagoon (2) is configured so that it has a Biofilm Index (BFI) value ranging from 0 to 0.05, wherein monitoring each of these variables according to the specifically tailored BFI equation is essential and especially important in the present technology. When higher temperatures than non-acclimatized lagoons are present, providing a range of BFI from 0 to 0.05 synergistically relates all variables, and is crucial to minimize microorganism breeding grounds.

For example, microbial proliferation on the liner bottom surfaces or walls of the man-made swimming lagoon (2) may alter the color of these surfaces and therefore affect the turquoise color of the water, besides affecting water quality and pose health risks to swimmers. Additionally, the BFI can be an indicator of biofilm growth on other structures like within the piping, thereby disrupting waste heat fluid flow and diminishing heat exchange efficiency.

The biofilm thickness represents the physical thickness of the biofilm layer that accumulates on the total inner surface within the man-made swimming lagoon (2), which is also an indicator of biofilm accumulation in other structures such as pipes. In this manner, biofilms, which are communities of microorganisms encased in a protective matrix, can form on surfaces such as walls, floors, piping, and other submerged structures. The thickness of the biofilm is important because thicker biofilms can harbor more microorganisms, promote biofouling, reduce the effectiveness of the heat transfer, change the color of the surfaces of the man-made swimming lagoon (2), thus, the turquoise color of the water, and reduce the cleaning, filtering, and disinfection effectiveness. Various measurement techniques may be employed for measuring the biofilm thickness. These include ultrasonic measurement for precise thickness detection, electrochemical sensors to monitor the bioelectrochemical activity of biofilms, light scattering for optical density assessment, and impedance spectroscopy for evaluating changes in surface properties, among others. For example, the biofilm thickness may be measured at multiple points of the lagoon until reaching statistical significance for assessing the general biofilm thickness on the total inner surface within the man-made swimming lagoon (2). As an illustrative example, for a man-made swimming lagoon of 3,000 m$^2$, measuring the biofilm thickness on at least 7 points separated by 20 meters would be enough for reaching significance when calculating the general biofilm thickness on the total inner surface, with a 95% confidence level. These techniques may be combined or adapted depending on the lagoon's characteristics and operational needs, and can be performed by coupon sampling or by direct measurements on the inner surface of the man-made swimming lagoon.

The microbial load refers to the concentration of microorganisms, measured in Colony Forming Units per milliliter (CFU/mL). This metric indicates the number of viable bacteria present in the water within the man-made swimming lagoon (2). A high microbial load can lead to the growth of bacteria that produces biofouling, increases turbidity, or favor the growth of pathogens, increasing the risk of infections for swimmers. Therefore, microbial load assessment though the BFI serves as a critical measure of the contamination levels in the man-made swimming lagoon (2). The microbial load according to this invention refers to the total coliform bacteria in CFU/mL, which can be measured through membrane filtration, most probable number method, flow cytometry, qPCR, among others.

The biofilm coverage area measures the percentage of the lagoon's total inner surface area that is covered by biofilm. The biofilm coverage area is significant because even if the biofilm is thin or the microbial load is low, a large coverage area can still pose issues. Extensive biofilm coverage can create aesthetic problems, contribute to unpleasant odors, reduce the efficiency of the lagoon's water circulation, and heat exchange. Managing the biofilm coverage area helps maintain the lagoon's visual appeal, thus, recreational quality, and operational performance, while reducing maintenance costs and cleaning efforts. Various measurement techniques may be employed for measuring the inner surface covered in biofilm. These include image analysis techniques, where high-resolution cameras or drones capture images of the surfaces, followed by processing through software to identify and quantify biofilm-covered areas. Optical sensors, such as laser-based reflectometry, can detect changes in surface reflectivity caused by biofilms, offering a non-invasive and accurate coverage measurement. Fluorescence-based methods can also be used, employing dyes or stains that bind specifically to biofilms and fluoresce under specific light wavelengths, enabling precise mapping of biofilm-covered zones. Ultrasound scanning is another approach, detecting biofilm presence through differences in acoustic impedance between biofilm and the substrate. These techniques may be performed providing measurements at multiple points of the lagoon until reaching statistical significance for assessing the total inner surface covered in biofilm in the man-made swimming lagoon (2). As an illustrative example, for a man-made swimming lagoon of 3,000 m$^2$, measuring the inner surface covered in biofilm on at least 7 points separated by 20 meters would be enough for reaching significance when calculating the general total inner surface covered in biofilm, with a 95% confidence level. These techniques may be combined or adapted depending on the lagoon's characteristics and operational needs, and can be performed by coupon sampling or by direct measurements on the inner surface of the man-made swimming lagoon.

High Temperature Water Treatment System (HTWTS)

The sustainable heat transfer system comprises a High Temperature Water Treatment System (HTWTS)(3) comprising an oxidant injection unit (4) configured with an oxidant injection protocol, consisting on performing an oxidant treatment cycle which consists of maintaining a minimum ORP in at least a portion of the man-made swimming lagoon (2) at a specific value for a particular temperature of the water, starting at 500 mV at 25° C. and increasing linearly to 750 mV at 40° C., wherein the protocol includes a minimum time for each oxidant treatment cycle at 40° C. of 30 minutes and a minimum time for each oxidant treatment cycle at temperatures below 40° C. of 3 additional hours per each ° C. below 40° C., according to the following equations:

$$\text{Minimum } ORP(T) = 500 \text{ mV} + 16.67 \text{ mV}/°C. * (T - 25°C.)$$

$$t(T) = \begin{cases} 30 \text{ min} & \text{if } T = 40°C. \\ 30 \text{ min} + 180 \text{ min}/°C. * (40°C. - T) & \text{if } 25°C. \leq T < 40°C. \end{cases}$$

wherein,

T is the average temperature of the water in the at least a portion of the man-made swimming lagoon (2) in ° C., t is time in minutes;

The oxidant injection unit (4) is configured to add at least one chemical agent that produces oxidation in the water, the chemical agent being selected from the group comprising a chlorine-based chemical agent, a bromine-based chemical agent, ozone, or monopersulfates.

In most cases, an ORP between 500 mV and 750 mV would correspond to a free chlorine concentration of about 0.5 to 3 mg/L under typical conditions with a pH between 7 to 8. This oxidant injection protocol is specifically tailored to contribute to maintaining the optimal value ranges for THI, TRI, COIN, and BFI.

The temperature-dependent oxidant dosing as part of the oxidant injection protocol in the HTWTS (3) is crucial for optimizing the overall effectiveness of the sustainable heat transfer system. As temperature increases, the chemical activity and biological processes in the water also intensify, leading to faster growth of microorganisms, increased biofilm formation, and higher corrosion. In addition to influencing microbial growth, higher temperatures also contribute to faster water contamination produced by bathers, as higher temperatures aid in better dissolving of oils, sweat, lotions, and other organic materials into the man-made swimming lagoon (2). As the oxidant injection protocol is tailored according to the water temperature, the system ensures that disinfection is always efficient, no matter the conditions. The incremental change of ORP per degree Celsius allows for fine-tuning of the oxidant injection, preventing under or over-dosing, which could either lead to ineffective control of microbial growth, and precipitation control. This dynamic oxidant injection protocol plays a critical role in maintaining the optimal ranges for the indexes of the present technology, ensuring the system maintains high recreational quality and optimal heat exchange, and remains sustainable, energy-efficient, and safe for operations.

In an embodiment, the man-made swimming lagoon (2) comprises at least 1 bottom inlet per 53 m².

In an embodiment, the complete water volume of the man-made swimming lagoon (2) is filtered up to 2.5 times within a 24-hour period.

Skimmer systems in traditional swimming pools are also expensive and complex. In terms of the use of skimmers/gutters, pool regulations require that 100% of the recirculation water flow may be processed through the skimmers, which generally requires the presence of gutters along the complete perimeter of the pool, or with minimal disruption, in order to be able to homogeneously distribute the surface water through such system when being withdrawn from the pool in order to be sent to the centralized filtration system.

In an embodiment, the High Temperature Water Treatment System (HTWTS)(3) includes a flocculant injection unit, configured for adding one or more flocculants agents selected from the group including synthetic polymers, quaternary ammonium cationic polymers, polycationic polymers, aluminum salts, calcium oxide, calcium hydroxide and mixtures thereof to the man-made swimming lagoon (2). The flocculant injection unit includes a flocculant injection protocol consisting of injecting an amount of flocculant such that a Flocculant Filtration Index (FFI) value between 0.04 and 10, preferably between 0.05 and 5, and more preferably between 0,06 and 3, is maintained, wherein the FFI is calculated according to:

$$FFI = \text{Flocculant concentration}\left(\frac{mg}{L}\right) * \text{Filtration rate(turnovers/day)}$$

For example, for a filtration rate of 2.5 turnovers/day, flocculant may be injected until reaching a concentration of 1 mg/L of flocculant on the man-made swimming lagoon (2) according to the flocculant injection protocol.

The flocculation process aids in the removal of suspended particles, sediment, and other contaminants by causing these particles to aggregate into larger flocs, which can then be more easily separated from the water through sedimentation or filtration. This process contributes on maintaining the TRI between 0 and 1, therefore ensuring water clarity and quality thought the reduction of turbidity and maintaining a turquoise hue by keeping the bottom surface clean, particularly in high-temperature environments where sediment and organic contaminants may be more prone to dispersing or forming.

Waste Heat Transfer System

The sustainable heat transfer system comprises a waste heat transfer mechanism (5), which plays a pivotal role in transferring heat generated by the digital processing facility (1) to the man-made swimming lagoon (2) for water heating, cooling the processing facility (1), or the combined effect of heating and heat dissipation.

In an embodiment, the heat transfer mechanism comprises a thermal exchange apparatus to exchange the heat the digital processing facility (1) to the water of the man-made swimming lagoon (2). The thermal exchange apparatus is a critical component that enables the safe and efficient exchange of thermal energy without directly contacting any substance with the man-made swimming lagoon (2) water. This design ensures that the water in the man-made swimming lagoon (2) remains clean and uncontaminated, while still utilizing the excess heat generated by the digital processing facility (1).

The thermal exchange apparatus is selected from the group comprising a heat exchanger, a direct liquid cooling apparatus, a geothermal integration apparatus, a phase change material (PCM) apparatus, a radiative panels apparatus, and a thermosiphon apparatus. More preferably, the thermal exchange apparatus is a heat exchanger selected from the group comprising a heat exchanger configured for immersion heat transfer, a shell and tube heat exchanger, a plate heat exchanger, heat pipes, an immersion coil heat exchanger, and a finned heat exchanger, which allows thermal energy to pass from the waste heat fluid to the cooler water of the man-made swimming lagoon (2). Even more preferably, the heat exchanger is selected from a group consisting of double tube type exchangers, three-tube type exchangers, spiral coil type exchangers, PCM package exchangers, board type exchangers and enclosed exchangers. This type of heat exchange is crucial because it ensures that no chemical additives or impurities from the digital processing facility's waste heat fluid enter the man-made swimming lagoon (2), preserving the water's quality for recreational use and maintaining the balance of key indexes.

In an embodiment, the whole digital processing facility (1) functions as a thermal exchange mechanism, for example by being immersed in the man-made swimming lagoon (2).

The waste heat transfer mechanism (5) is designed to handle varying temperatures and flow rates, allowing for dynamic heat exchange based on the digital processing facility's operational demands. The use of a waste heat transfer mechanism (5) in this sustainable heat transfer system not only enhances its energy efficiency but also contributes to the sustainability of the overall facility. By utilizing this technology, the digital processing facility (1) reduces its dependence on traditional, energy-intensive cooling methods, thereby lowering operational costs and minimizing the facility's environmental impact. The waste heat transfer mechanism (5) ensures that the heat is effectively dissipated into the man-made swimming lagoon (2) while protecting the lagoon's water quality, making it a key element in the sustainable management of both the digital processing facility (1) and the man-made swimming lagoon (2).

In an embodiment, the waste heat transfer mechanism (5) comprises thermally insulated piping, designed to efficiently transport a heated fluid from the digital processing facility (1) to the man-made swimming lagoon (2) and return the cooler fluid back to the digital processing facility (1), forming a closed-loop system. Thermal insulation on the piping is essential for minimizing heat loss during transport, ensuring that the heat is primarily released into the man-made swimming lagoon (2) rather than lost during transit. This maintains the efficiency of the sustainable heat transfer system and avoids undesired externalities. For this closed-loop implementation, there would not be any mixing of waste heat fluid with the water of the man-made swimming lagoon (2).

The piping system is engineered with fittings and joints that are specifically adapted to withstand the high temperatures of the waste heat fluid. This durability is crucial because the waste heat fluid, which can reach elevated temperatures, requires piping materials that resist thermal expansion and stress, preventing leaks or breakdowns over time. These robust fittings and joints ensure the longevity of the system and help maintain consistent operational performance under varying temperature conditions. Additionally, the loop includes a pump (7) that is configured with a waste heat circulation protocol such that the flow of waste heat fluid through the system, maintains a steady and controlled circulation rate to ensure optimal heat exchange between the digital processing facility (1) and the man-made swimming lagoon (2). The circulation protocol ensures that the waste heat is transferred efficiently into the man-made swimming lagoon (2), where it is absorbed and dissipated through the water. The flow rate is tailored to match the digital processing facility's heat output and the lagoon's capacity for heat absorption, balancing the thermal load to prevent overheating and maintain stable operating temperatures.

In an embodiment, the heat transferred to the man-made swimming lagoon (2) is through heated water that enters the man-made swimming lagoon (2) through a series of inlets, including but not limited to nozzles, piping, jets, or similar elements. The man-made swimming lagoon (2) can also include the use of spray jets, waterfalls, spray zones, and moving water flows.

It is also important to maintain a relatively close distance between the digital processing facility (1) and the man-made swimming lagoon (2), to minimize heat loss in any heat transfer process. In an embodiment, the distance between the digital processing facility (1) and the man-made swimming lagoon (2) is such that 0° C. to 5° C. are lost while transporting the waste heat from the digital processing facility (1) to the man-made swimming lagoon (2), which is critical for balancing both operational efficiency and practical considerations in the sustainable heat transfer system. Distance is a key factor because it directly impacts the efficiency of heat transfer and the overall energy consumption required to transport waste heat from the digital processing facility (1) to the man-made swimming lagoon (2). If the distance is too long, the transport of waste heat through insulated piping becomes less energy efficient and/or more expensive, as greater distances lead to increased heat loss. Additionally, longer pipelines require more pumping energy to circulate the waste heat fluid, potentially raising operational costs and reducing the sustainability of the system. Longer distances also increase the complexity of maintaining the piping infrastructure, as more joints, fittings, and segments are required, heightening the potential for leaks or mechanical failures.

In another embodiment, the system further comprises a control system comprising sensors and automated controls configured to monitor and adjust operational parameters in real time. This advanced control system optimizes the performance and efficiency of the entire cooling process for the digital processing facility (1). The sensors embedded throughout the system continuously collect data on key variables such as water temperature, flow rates, biofilm formation through measuring of bottom color and CFU, and chemical concentrations. These sensors are strategically placed in critical locations, such as in the man-made swimming lagoon (2), along the waste heat recirculation loop (6), and at the heat exchanger. By constantly monitoring these parameters, the control system can detect even minor fluctuations or changes in real time, allowing for immediate adjustments to maintain the system's operational integrity.

In an embodiment of the invention, the swimming lagoon is able to collect direct rainwater that falls within the swimming lagoon's surface, which helps to refill the swimming lagoon and therefore reduce the amount of water necessary for refilling and/or maintaining the water level. For example, the swimming lagoons is able to collect direct rainwater to replace water lost to evaporation at a rate dependent on the rainwater conditions of the specific location where the swimming lagoon is located. For example, it has been observed that a swimming lagoon located in South Africa is able to refill an average of 14% of the total water lost to evaporation with rainwater on a yearly basis. For the same example, on a monthly basis, the percentage of water refilling through rainwater can be up to 40%. In order to be able to collect such rainwater for refilling purposes, the swimming lagoon is designed and configured with a freeboard and skimmers that are able to receive and collect such water.

In another embodiment, the control system is further configured to generate carbon credits by calculating the reduction in carbon emissions achieved through the energy-efficient cooling of the digital processing facility (1) and the heating of the man-made swimming lagoon (2). This feature allows the system to not only operate sustainably but also to quantify its environmental impact in terms of carbon savings. By leveraging this functionality, the digital processing facility (1) can actively participate in carbon credit markets, contributing to its overall environmental goals and potentially creating an additional revenue stream. The control system calculates the reduction in carbon emissions by monitoring and analyzing the energy saved through the lagoon-based sustainable heat transfer system compared to traditional, energy-intensive cooling methods, such as mechanical chillers, or energy intensive heating system. For example, by transferring waste heat from the digital processing facility (1) to the man-made swimming lagoon (2), the system reduces the need for electric cooling systems and heating systems, which typically rely on fossil fuels to generate the necessary power. The system uses sensors and data analytics to accurately calculate the difference in energy consumption, and from this data, it calculates the corresponding reduction in carbon emissions based on established carbon accounting standards.

As an example, A 50 MW data center can generate around 30 MW of recoverable heat. According to the U.S Energy Information Administration, the amount of $CO_2$ produced when using coal, natural gas or petroleum for energy generation is 2.30 pounds/kWh, 0.97 pounds/kWh and 2.38 pounds/kWh respectively. Therefore, dissipating 30 MW of heat is equivalent to avoiding approximately 115.000-280.000 tons of $CO_2$ per year if used to replace the use of fossil fuels.

In another embodiment, the system is configured to further track and generate additional environmental or sustainability credits, offering a broader approach to sustainability. For instance, the system may calculate and generate energy efficiency credits (EECs) by optimizing cooling efficiency through the man-made swimming lagoon (2), reducing the overall energy demand. It may also track and store biodiversity credits if as habitat is further conserved by avoiding the externalities of other cooling alternatives. On the other hand, for the man-made swimming lagoon (2), the system may calculate water restoration certificates (WRCs) for water-saving and replenishment techniques within the man-made swimming lagoon (2). All relevant data, including reductions in emissions, water savings, and other environmental impacts, can be stored in a non-transitory computer-readable medium, allowing for seamless integration with existing carbon markets and environmental certification programs, ultimately supporting a multi-faceted approach to achieving and monetizing sustainability goals.

In an embodiment, the man-made swimming lagoon (2) includes at least one dock extending from the periphery of the man-made swimming lagoon (2) toward its deeper portion, providing a functional and aesthetic addition to the lagoon's design. The dock serves as a practical access point for users, allowing them to easily reach and enter the deeper areas of the man-made swimming lagoon (2), which may be otherwise difficult to access from the shallow edges. This not only enhances the lagoon's usability but also encourages recreational activities such as swimming, diving, and other aquatic sports.

In an embodiment, the man-made swimming lagoon (2) can be used for the practice of water sports selected from the group consisting of kayaking, stand-up paddling, boating, water skiing, windsurfing, wakeboarding, canoeing, rowing, jet skiing, parasailing, kiteboarding, tubing, paddle boating, sailboarding, flyboarding, diving, skimboarding, dragon boat racing, outrigger canoeing, surfing, bodyboarding, and hydrofoil boarding.

In an embodiment, the man-made swimming lagoon (2) includes sand beach areas surrounding the perimeter of the man-made swimming lagoon (2), wherein the sand of the sand beach area has a light color thereby resembling a tropical beach. The light-colored sand enhances the aesthetic appeal by providing a visually striking contrast against the water, creating a serene and inviting environment that mirrors the look and feel of natural tropical beaches. The sand of the present system has a granulometry ranging from 0.2 mm to 1 mm in diameter, with a preference for finer grains within this range to create a soft, comfortable surface for walking and lounging. The fine, granular composition also contributes to the visual uniformity of the beach, further enhancing the tropical aesthetic. In addition to its aesthetic qualities, the light-colored sand reflects more sunlight, helping to lower surface temperatures and improve user comfort in hot environments.

In an embodiment, the man-made swimming lagoon (2) water has turquoise water resembling a tropical sea. The turquoise color is achieved through a combination of factors closely influenced by the key indexes of the present technology, including the water's clarity, depth, the color of the lagoon's liner, and the controlled chemical balance, which together replicate the vibrant, crystal-clear waters characteristic of tropical environments. Preferably, the man-made swimming lagoon (2) has a maximum depth of 1.4 m.

The man-made swimming lagoon (2) is designed to be used by a minimum of 50,000 users per year. This usage capacity reflects the large-scale nature of the man-made swimming lagoon (2), which is engineered to handle high volumes of visitors while maintaining optimal water quality, safety standards, and user comfort.

In an embodiment, the system comprises spray nozzles (10) configured to spray water, reducing the temperature when the temperature rises over 30° C. in the tropical bathing zone (8), or over 40° C. in the thermal water zone (9).

EXAMPLES

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments disclosed and still obtain a like or similar result without departing from the spirit and scope of the invention.

The examples presented below are prophetic examples. A prophetic example describes an embodiment of the invention based on predicted results. These prophetic examples are provided for illustrative purposes and are not to be construed as limitations of the present invention.

Prophetic Example I: Implementation of a Sustainable Heat Transfer System

In a temperate climate region, a technology company planned to construct a new 6 MW data center. To enhance sustainability and provide community benefits, the company decided to implement a sustainable heat transfer system that integrates the data center with a 4.5-acre man-made swimming lagoon designed for recreational use.

The man-made swimming lagoon was designed with an elongated shape and two main zones: a tropical bathing zone designed for maintaining temperatures of 28-30° C., and a thermal water zone maintaining temperatures of about 37° C.

To manage water quality and temperature, a High Temperature Water Treatment System (HTWTS) was implemented. An oxidant injection unit was installed and configured to maintain an oxidation-reduction potential (ORP) of 560 mV for the tropical bathing zone at 29° C. The oxidant treatment cycle was designed to run for a minimum of 6 hours, and the protocol required an additional 3 hours per degree Celsius below 40° C., totaling 45 hours.

To maintain optimal water quality, the lagoon's parameters were carefully monitored and controlled. The Thermo-Hardness Index (THI) was maintained at approximately 0.83 adjusting the water's pH through controlled $CO_2$ injection, the water having a calcium carbonate concentration of 96 mg/L and an average water temperature of 28° C.

The Thermo-Refraction Index (TRI) was maintained at approximately 0.65. The turbidity was kept at 1.5 NTU by filtering the complete volume of water of the man-made swimming lagoon 0.8 times within a 24 hour timeframe, and the Grey Index (G) was maintained by bottom filtering on a luminance (Y) value of 80, resulting in G=1−(80/100)=0.2.

The Copper Index (COIN) was maintained at 0.3. With a copper concentration of 0.3 mg/L maintained by the addition of HEDP following a protocol of weekly adding of HEDP at a dose of about 10 mg/L HEDP for each 1 mg/L copper measured above 0.3 mg/L.

The Biofilm Index (BFI) was maintained at 0.04 by action of the oxidant injection unit. The biofilm thickness was 1 μm, the microbial load was 20 CFU/mL, and the biofilm coverage area was 5% (expressed as 0.05 in decimal form). Biofilm thickness and coverage area were calculated as the average of 12 ultrasound measurements performed on the inner surface of the man-made swimming lagoon, having a separation of 20 m from each measurement point.

A waste heat recirculation loop was established to transport waste heat fluid from the data center to the man-made swimming lagoon. Thermally insulated stainless steel piping with high-performance insulation, rated for temperatures up to 80° C., was used. The piping included fittings and joints adapted to withstand the temperature range of the waste heat fluid, incorporating expansion joints to accommodate thermal expansion. A pump was configured with a waste heat circulation protocol, circulating waste heat fluid. The flow rate was adjusted based on real-time temperature readings to maintain the lagoon temperatures within the desired ranges.

A spiral coil type heat exchanger made of corrosion-resistant alloys was installed to indirectly transfer the waste heat from the data center to the lagoon water. This heat exchanger facilitated efficient heat transfer while preventing direct contact between the waste heat fluid and the lagoon water, thus maintaining water quality.

Operationally, the integration of the data center with the man-made swimming lagoon resulted in significant environmental sustainability and financial benefits. By utilizing the lagoon for cooling, the need for traditional cooling towers or chillers was eliminated. These energy savings translated into significant cost reductions, with an estimated annual savings of $7 million in energy expenses based on average typical costs of $200 per MWh. Furthermore, the reduction in maintenance costs associated with conventional cooling systems, such as chillers or cooling towers, contributed an additional $1.5 million in savings annually, as the lagoon required less complex infrastructure and fewer operational resources. Water conservation was achieved by repurposing waste heat for lagoon heating instead of relying on evaporative cooling methods, reducing water usage by approximately 20%, which further saved an estimated $500,000 in annual water costs. In total, the system saved the company approximately $9 million per year in operational costs, while preventing the emission of an estimated 42,000 tons of $CO_2$ annually. These carbon savings could also be monetized through carbon credit markets, offering an additional revenue stream of approximately $840,000 per year, based on an average carbon credit price of $20 per ton of $CO_2$. The system demonstrated how technological innovation could align industrial needs with social, financial, and ecological responsibilities, effectively repurposing waste heat for community benefit while enhancing both environmental sustainability and cost efficiency.

Prophetic Example II: Implementation of a Sustainable Heat Transfer System with Man-Made Swimming Lagoon Having Surfing Purposes In a cold climate region, a technology company planned to construct a new 4 MW data center. To enhance sustainability and provide community benefits, the company decided to implement a sustainable heat transfer system that integrates the data center with a 4-acre man-made swimming lagoon designed for recreational use including surfing purposes.

The man-made swimming lagoon was designed with an elongated shape, having a surfing purpose and being designed as for having temperatures of 25-31° C.

To manage water quality and temperature, a High Temperature Water Treatment System (HTWTS) was implemented. An oxidant injection unit was installed and configured to maintain an oxidation-reduction potential (ORP) of 560 mV for the man-made swimming lagoon at 29° C. The oxidant treatment cycle was designed to run for a minimum of 6 hours, and the protocol required an additional 3 hours per degree Celsius below 40° C., totaling 45 hours.

To maintain optimal water quality, the lagoon's parameters were carefully monitored and controlled. The Thermo-Hardness Index (THI) was maintained at approximately 0.83 adjusting the water's pH through controlled $CO_2$ injection, the water having a calcium carbonate concentration of 96 mg/L and a water temperature of 29° C.

The Thermo-Refraction Index (TRI) was maintained at approximately 0.65. The turbidity was kept at 1.5 NTU by filtering the complete volume of water of the man-made swimming lagoon 1 time within a 24 hour timeframe, and the Grey Index (G) was maintained by bottom filtering on a luminance (Y) value of 80, resulting in G=1−(80/100)=0.2.

The Copper Index (COIN) was maintained at 0.3. With a copper concentration of 0.3 mg/L maintained by the addition of HEDP following a protocol of weekly adding of HEDP at a dose of about 10 mg/L HEDP for each 1 mg/L copper measured above 0.3 mg/L.

The Biofilm Index (BFI) was maintained at 0.04 by action of the oxidant injection unit. The biofilm thickness was 1 μm, the microbial load was 20 CFU/mL, and the biofilm coverage area was 5% (expressed as 0.05 in decimal form). Biofilm thickness and coverage area were calculated as the average of 10 ultrasound measurements performed at the inner surface of the man-made swimming lagoon, the measurements having a separation of 20 m from each other.

A waste heat recirculation loop was established to transport waste heat fluid from the data center to the man-made swimming lagoon. Thermally insulated stainless steel piping with high-performance insulation, rated for temperatures up to 80° C., was used. The piping included fittings and joints adapted to withstand the temperature range of the waste heat fluid, incorporating expansion joints to accommodate thermal expansion. A pump was configured with a waste heat circulation protocol, circulating waste heat fluid. The flow rate was adjusted based on real-time temperature readings to maintain the lagoon temperatures within the desired ranges.

A spiral coil type heat exchanger made of corrosion-resistant alloys was installed to indirectly transfer the waste heat from the data center to the lagoon water. This heat exchanger facilitated efficient heat transfer while preventing direct contact between the waste heat fluid and the lagoon water, thus maintaining water quality.

Given the surfing purpose of the man-made swimming lagoon and the water movement within, the temperature of the water was maintained homogeneously within the man-made swimming lagoon further aided by the water movement produced by the surf waves.

What is claimed is:

1. A heat transfer system comprising a digital processing facility (1) and a recreational man-made swimming lagoon (2) having specific biological, chemical and physicochemical standards for providing cooling to such digital processing facility (1), the system being configured for contributing to environmental sustainability and community benefits, comprising:
 a. the man-made swimming lagoon (2) having a water surface of between 3,000 m² to 1,000,000 m² that is configured and arranged to receive waste heat from the digital processing facility (1) and provide cooling to such facility, so that at least a portion of the man-made swimming lagoon (2) is heated and maintained at an average temperature between 25° C. and 40° C., wherein the man-made swimming lagoon (2) comprises a bottom covered with a non-permeable material;
 b. a High Temperature Water Treatment System (HTWTS)(3) configured with an oxidant injection protocol, consisting of performing an oxidant treatment cycle, wherein:
  i. the oxidant treatment cycle consists of maintaining a minimum ORP in at least a portion of the man-made swimming lagoon (2) at a specific value for a particular temperature of the water, starting at 500 mV at 25° C. and increasing linearly to 750 mV at 40° C.,
  ii. the oxidant injection protocol includes a minimum time for each oxidant treatment cycle at 40° C. of 30 minutes and a minimum time for each oxidant treatment cycle at temperatures below 40° C. of 3 additional hours per each ° C. below 40° C., according to the following equations:

$$\text{Minimum } ORP(T) = 500 \text{ mV} + 16.67 \text{ mV}/°C. * (T - 25°C.)$$

$$t(T) = \begin{cases} 30 \text{ min} & \text{if } T = 40°C. \\ 30 \text{ min} + 180 \text{ min}/°C. * (40°C.-T) & \text{if } 25°C. \leq T < 40°C. \end{cases}$$

wherein,
T is the average temperature of the water in the at least a portion of the man-made swimming lagoon (2) in ° C.,
t is time in minutes;

c. a waste heat transfer mechanism (5) to exchange the heat from the digital processing facility (1) with the water of the man-made swimming lagoon (2), wherein the waste heat transfer mechanism is configured to transfer beat from the digital processing facility (1) to the man-made swimming lagoon (2) through conduction, convection, radiation, or combinations thereof, d. wherein the water contained within the man-made swimming lagoon (2) has a Thermo-Hardness Index (THI) value from 0 to 1 wherein the THI is defined according to the following equation:

$$THI = \frac{H}{H_{max}(T)}$$

wherein,
H is the average concentration of calcium carbonate of the water of the man-made swimming lagoon (2) in mg/L,
$H_{max}(T)$ is the maximum allowed concentration of calcium carbonate in mg/L at temperature T in ° C., wherein T is the average temperature in ° C. of the water in the at least a portion of the man-made swimming lagoon (2) and T is within $T_{Min}$ and $T_{Max}$, wherein Twin is a minimum allowed average temperature in ° C. in the at least a portion of the man-made swimming lagoon (2) and $T_{Max}$ is a maximum allowed average temperature in ° C. in the at least a portion of the man-made swimming lagoon (2),
Hyrax (T) being defined according to:

$$H_{max}(T) = [CaCo_3]_{T_{Max}} - \left(\frac{[CaCO_3]_{T_{Max}} - [CaCO_3]_{T_{Min}}}{T_{Max} - T_{Min}} * (T - T_{Min})\right)$$

wherein, $[CaCo_3]T_{Max}$, is a maximum allowed hardness in mg/L for the water in the at least a portion of the man-made swimming lagoon (2) at $T_{Max}$, and $[CaCo_3]T_{Max}$ is a maximum allowed hardness in mg/L for the water in the at least a portion of the man-made swimming lagoon (2) at $T_{Min}$,
wherein, Twin is 25° C., $T_{Max}$ is 40° C., $[CaCo_3]T_{max}$, is 200 mg/L, and $[CaCo_3]T_{Min}$, is 100 mg/L; and wherein the Thermo-Hardness index is only used and relevant for man-made swimming lagoons using water having a total dissolved solid's concentration of up to 1,500 ppm;

e. wherein the water contained within the man-made swimming lagoon (2) has a Thermo-Refraction Index (TRI) value ranging from 0 to 1 wherein the TRI is defined according to the following equation:

$$TRI = \frac{N}{8} + G + \frac{T - 25°C.}{15°C.}$$

wherein,
N is the average turbidity of the water in NTU,
G is a Grey Index defined as 1 minus the inverse of luminance (Y) divided by 100 according to $$G = 1 - \frac{Y}{100}$$

T is the average temperature of the water in the at least a portion of the man-made swimming lagoon (2) in ° C., f. wherein, the water contained within the man-made swimming lagoon (2) has a Copper Index (COIN) value ranging from 0 to 1, wherein the COIN is defined according to the following equation:

$$COIN = \frac{[Cu]}{[Cu]_{max}(T)}$$

wherein,
[Cu] is the concentration of copper on the water of the at least a portion of the man-made swimming lagoon (2) in mg/L,
$[Cu]_{max}(T)$ is the maximum allowed concentration of copper at temperature T in mg/L,
$[Cu]_{max}(T)$ being defined according to:

$$[Cu]_{max}(T) = 1 \text{ mg}/L - \left(\frac{0.4 \text{ mg}/L}{12°C.} * (T - 28°C.)\right)$$

g. wherein, the man-made swimming lagoon (2) has a Biofilm Index (BFI) value ranging from 0 to 0.05, wherein the BFI is defined according to the following equation:

$$BFI = \left(\frac{B_t}{100 \text{ μm}}\right) + \left(\frac{M_l}{1000 \text{ CFU}/\text{mL}}\right) + \left(\frac{B_a}{5}\right)$$

wherein,
$B_t$ is biofilm thickness in the at least a portion of the man-made swimming lagoon (2) in μm,
$M_l$ is microbial load of the water within an area of the man-made swimming lagoon (2) in CFU/mL of total coliforms,
$B_\alpha$ is biofilm coverage area of the total inner surface of the at least a portion of the man-made swimming lagoon (2) according to:

$$B_a = \frac{\text{Inner surface covered in biofilm }[m^2]}{\text{Total inner surface}[m^2]}.$$

2. The system according to claim 1, wherein the heated portion of water within the man-made swimming lagoon (2) has a surface area of at least 40 m².

3. The system according to claim 1, wherein the system comprises a waste heat recirculation loop (6) comprising thermally insulated piping configured to transport a waste heat fluid from the digital processing facility (1) to the man-made swimming lagoon (2), wherein the piping includes fittings and joints adapted to withstand the temperature range of the waste heat fluid, and a pump (7).

4. The system according to claim 1, wherein the man-made swimming lagoon (2) comprises multiple temperature zones with at least two different zones having different average temperatures.

5. The system according to claim 4, wherein the different temperature zones are created throughout the man-made swimming lagoon (2) through the use of partial physical barriers.

6. The system according to claim 4, wherein the difference between the average temperature of two different zones is at least 4° C. for at least 30 days.

7. The system according to claim 5, wherein the partial physical barriers modify the path of the water flow flowing through the man-made swimming lagoon (2) between its inlet and outlet points.

8. The system according to claim 1, wherein there is a distance between the digital processing facility (1) and the man-made swimming lagoon (2) such that the temperature of a heat transfer fluid decreases between 0° C. to 5° C. in the fluid transport while transporting the waste heat from the digital processing facility (1) to the man-made swimming lagoon (2).

9. The system according to claim 1, wherein the man-made swimming lagoon (2) comprises a tropical bathing zone (8) that maintains a temperature between 25° C. and 30° C., and a thermal water zone (9) that maintains a temperature between 30° C. and 40° C.

10. The system according to claim 1, wherein the average temperature of between 25° C. and 40° C. within the portion of water to be heated is maintained year-round.

11. The system according to claim 9, wherein the system comprises spray nozzles (10) configured to spray water, reducing the temperature when the temperature rises over 30° C. in the bathing zone (8), or over 40° C. in the thermal water zone (9).

12. The system according to claim 1, wherein the non-permeable material is a plastic liner.

13. The system according to claim 12, wherein the liner is installed over a shotcrete shell or slab.

14. The system according to claim 1, wherein the man-made swimming lagoon (2) comprises at least 1 bottom inlet per 53 m².

15. The system according to claim 1, wherein the complete water volume within the man-made swimming lagoon (2) is filtered up to 2.5 times within a 24-hour period.

16. The system of claim 1, wherein the High Temperature Water Treatment System (HTWTS)(3) is configured to add at least one chemical agent that produces oxidation in the water, the chemical agent being selected from the group comprising a chlorine-based chemical agent, a bromine-based chemical agent, ozone, or monopersulfates.

17. The system according to claim 1, wherein the High Temperature Water Treatment System (HTWTS)(3) is configured to add one or more flocculants agents selected from the group including synthetic polymers, quaternary ammonium cationic polymers, polycationic polymers, aluminum salts, calcium oxide, calcium hydroxide and mixtures thereof to the man-made swimming lagoon (2).

18. The system according to claim 17, wherein the High Temperature Water Treatment System (HTWTS)(3) includes a flocculant injection protocol consisting of injecting an amount of flocculant such that a Flocculant Filtration Index (FFI) value between 0.06 and 3, is maintained, wherein the FFI is calculated according to:

$$FFI = \text{Flocculant concentration}\left(\frac{mg}{L}\right) * \text{Filtration rate(turnovers/day)}.$$

19. The system according to claim 1, wherein the man-made swimming lagoon (2) collects rainwater that falls directly over the man-made swimming lagoon's surface to allow for refilling the man-made swimming lagoon (2).

20. The system according to claim 1, wherein the man-made swimming lagoon (2) comprises a surf portion comprising at least one artificial surf wave generator.

21. The system according to claim 1, wherein the man-made swimming lagoon (2) can be used for the practice of water sports selected from the group consisting of kayaking, stand-up paddling, boating, water skiing, windsurfing, wakeboarding, canoeing, rowing, jet skiing, parasailing, kiteboarding, tubing, paddle boating, sailboarding, flyboarding, diving, skimboarding, dragon boat racing, outrigger canoeing, surfing, bodyboarding, and hydrofoil boarding.

22. The system according to claim 1, wherein the waste heat transfer mechanism (5) comprises a thermal exchange apparatus.

23. The system according to claim 22, wherein the thermal exchange apparatus is selected from the group comprising a heat exchanger, a direct liquid cooling apparatus, a geothermal integration apparatus, a phase change material (PCM) apparatus, a radiative panels apparatus, and a thermosiphon apparatus.

24. The system according to claim 22, wherein the thermal exchange apparatus is a heat exchanger selected from the group comprising a heat exchanger configured for immersion heat transfer, a shell and tube heat exchanger, a plate heat exchanger, heat pipes, an immersion coil heat exchanger, and a finned heat exchanger.

25. The system according to claim 24, wherein the heat exchanger is selected from a group consisting of double tube type exchangers, three-tube type exchangers, spiral coil type exchangers, PCM package exchangers, board type exchangers and enclosed exchangers.

26. The system according to claim 24, wherein the heat transferred to the man-made swimming lagoon (2) is transferred through heated water that enters the man-made swimming lagoon (2) through a series of inlets.

27. The system according to claim 24, wherein the man-made swimming lagoon (2) can also include the use of spray jets, waterfalls, spray zones, and moving water flows.

28. The system of claim 1, further comprising a control system comprising sensors and automated controls configured to monitor and adjust operational parameters in real time.

29. The system according to claim 28, wherein the control system is further configured to generate carbon credits and other sustainability credits by calculating the reduction in carbon emissions based on the energy saved by cooling the digital processing facility (1) and heating the man-made swimming lagoon (2), and to store data related to said carbon credits in a non-transitory computer-readable medium.

30. The system according to claim 1, wherein the digital processing facility (1) has a capacity from 0.3 MW to 1 MW, or 1 MW to 10 MW, or 10 MW to 50 MW, or 50 MW to 100 MW, or 100 MW to 500 MW, or 500 MW to 1 GW.

* * * * *